(12) United States Patent
O'Flaherty et al.

(10) Patent No.: US 12,195,375 B2
(45) Date of Patent: Jan. 14, 2025

(54) TREATMENTS OF ORGANIC WASTE

(71) Applicant: Glasport Bio Limited, Galway (IE)

(72) Inventors: Vincent O'Flaherty, Galway (IE); Camilla Thorn, Galway (IE); Chui Sang Lee, Galway (IE); Ruairi Friel, Galway (IE)

(73) Assignee: Glasport Bio Limited, Galway (IE)

( * ) Notice: Subject to any disclaimer, the term of this patent is extended or adjusted under 35 U.S.C. 154(b) by 0 days.

(21) Appl. No.: 17/228,209

(22) Filed: Apr. 12, 2021

(65) Prior Publication Data
US 2021/0230037 A1 Jul. 29, 2021

Related U.S. Application Data

(63) Continuation of application No. PCT/EP2019/077503, filed on Oct. 10, 2019.

(30) Foreign Application Priority Data

Oct. 10, 2018 (GB) .................................. 1816556

(51) Int. Cl.
*C02F 11/06* (2006.01)
*C02F 1/50* (2023.01)
(Continued)

(52) U.S. Cl.
CPC .............. *C02F 11/06* (2013.01); *C02F 1/50* (2013.01); *C02F 1/766* (2013.01); *C02F 11/02* (2013.01);
(Continued)

(58) Field of Classification Search
CPC .... C02F 1/50; C02F 1/766; C02F 3/28; C02F 11/02; C02F 11/06; C02F 1/722; C02F 2103/20; C05F 3/00
(Continued)

(56) References Cited

U.S. PATENT DOCUMENTS

| 3,288,708 A | 11/1966 | Cordle et al. |
| 3,970,554 A * | 7/1976 | Fischer .................. C02F 1/766 |
| | | 210/753 |

(Continued)

FOREIGN PATENT DOCUMENTS

| CN | 101027402 A | 8/2007 |
| CN | 101745525 A | 6/2010 |

(Continued)

OTHER PUBLICATIONS

Lin, English machine translation, CN 107200627, pp. 1-5 (Year: 2017).*

(Continued)

*Primary Examiner* — Claire A Norris
(74) *Attorney, Agent, or Firm* — Clark & Elbing LLP

(57) ABSTRACT

The invention provides treatments of organic waste. The invention provides a method for treating organic waste (and in particular, animal waste such as waste from a cow) and uses of a composition that is capable of generating a reactive species in methods of reducing biological degradation of organic waste, in the treatment of organic waste. The invention also provides organic waste treated by the methods of the invention and uses of this treated organic waste. The invention also provides a method for improving the production of volatile fatty acids (VFA) and medium-chain carboxylic acids (MCCAs) during anaerobic digestion (AD) of organic waste.

15 Claims, 11 Drawing Sheets

(51) Int. Cl.
  *C02F 1/76* (2023.01)
  *C02F 11/02* (2006.01)
  *C02F 3/28* (2023.01)
(52) U.S. Cl.
  CPC ............ *C02F 3/28* (2013.01); *C02F 2209/28* (2013.01); *C02F 2305/02* (2013.01)
(58) Field of Classification Search
  USPC ................................................ 210/721, 727
  See application file for complete search history.

(56) References Cited

U.S. PATENT DOCUMENTS

| | | | | |
|---|---|---|---|---|
| 4,155,975 | A | * | 5/1979 | Riley ........................ A61L 9/01 |
| | | | | 210/753 |
| 4,612,124 | A | | 9/1986 | Escrig |
| 2007/0289924 | A1 | | 12/2007 | Siegel et al. |
| 2011/0111475 | A1 | | 5/2011 | Kuhry et al. |
| 2013/0146513 | A1 | | 6/2013 | Shoseyov et al. |
| 2016/0076057 | A1 | | 3/2016 | Scalzi et al. |
| 2016/0355444 | A1 | * | 12/2016 | Olkowski ............... C08B 37/00 |

FOREIGN PATENT DOCUMENTS

| | | | |
|---|---|---|---|
| CN | 102159507 A | | 8/2011 |
| CN | 107200627 A | * | 9/2017 |
| CN | 107469105 A | * | 12/2017 |
| JP | H10128398 A | | 5/1998 |
| JP | 2002212013 A | * | 7/2002 |
| JP | 2004196570 A | | 7/2004 |
| WO | WO-94/19119 A1 | | 9/1994 |
| WO | WO-01/36338 A1 | | 5/2001 |
| WO | WO-2005/118826 A1 | | 12/2005 |
| WO | WO-2010/021552 A1 | | 2/2010 |
| WO | WO-2013/022998 A2 | | 2/2013 |

OTHER PUBLICATIONS

Chen et al, Formulating and Optimizing a Novel Biochar-Based Fertilizer for Simultaneous Slow-Release of Nitrogen and Immobilization of Cadmium, Sustainability, 2018, 10, pp. 1-14 (Year: 2018).*
Tan, English machine translation CN 107518000 A, pp. 1-3 (Year: 2017).*
International Search Report and Written Opinion for PCT/EP2019/077503, dated Apr. 28, 2020 (14 pages).
Search Report for GB 1816556.3, dated Nov. 7, 2018 (4 pages).
Matyás et al., "Explosive Properties and Thermal Stability of Urea-Hydrogen Peroxide Adduct," Propellants, Explosives, Pyrotechnics. DOI: 10.1002/prep.201600101 (2016) (7 pages).
Clement et al. "The Contribution of Ammonia and Alkalinity to Landfill Leachate Toxicity to Duckweed," The Science of Total Environment. 170:71-79 (1995).
Fangueiro et al. "Acidification of Animal Slurry—A Review," J Environ Manage. 149:46-56 (2015).
Jamaludin et al. "Evaluation of sustainable scrubbing agents for ammonia recovery from anaerobic digestate," Bioresour Technol. 270:596-602 (Aug. 2018).
Reidy et al. "Comparison of models used for national agricultural ammonia emission inventories in Europe: Liquid manure systems," Atmospheric Environment. 42:3452-3464 (2008).
Vilmain et al. "Kinetic study of hydrogen sulfide absorption in aqueous chlorine solution," Chemical Engineering Research and Design. 92:191-204 (2014).
Vikesland et al. "Effect of Natural Organic Matter on Monochloramine Decomposition: Pathway Elucidation through the Use of Mass and Redox Balances," Environ. Sci. Technol. 32(10):1409-1416 (1998).
Cooper. "Iodine revisited," Int Wound J. 4(2):124-137 (2007).
National Research Council (US) Safe Drinking Water Committee., *Drinking Water and Health, vol. 2.* National Academy Press, 1-393 (1980) (406 pages).
Starke., Chapter 14—Application of Iodine Water Purification Tablets: Iodine's Efficacy against Cryptosporidium parvum,* *Comprehensive Handbook of Iodine.* Victor R. Preedy, Gerard N. Burrow, and Ronald Watson, 135-138 (2009).
S.D. Lin., Tastes and Odors in Water Supplies—A Review, Illinois State Water Survey, vol. 127 of Circular (1977) (53 pages).
"Periodicity: 5.33—Group 17—The halogens", IB Chemistry, <https://www.ibchem.com/IB16/05.33.htm>, retrieved on Jun. 9, 2023 (4 pages).
"Disinfectants Chloramines", Lenntech, <https://www.lenntech.com/processes/disinfection/chemical/disinfectants-chloramines.htm>, retrieved on Jun. 9, 2023 (2 pages).
"Chloramines in Drinking Water", United States Environmental Protection Agency, <https://www.epa.gov/dwreginfo/chloramines-drinking-water>, retrieved on Jun. 9, 2023 (5 pages).
"Hydrogen peroxide", Wikipedia, <https://en.wikipedia.org/wiki/Hydrogen_peroxide>, retrieved on Jun. 27, 2023 (19 pages).
Erickson. "An Evaluation of Mathematical Models for the Effects of pH and Temperature on Ammonia Toxicity to Aquatic Organisms", Water Res. vol. 19(8):1047-1058 (1985).

* cited by examiner

Fresh slurry addition denoted by '+' symbol on the x axis

TREATMENTS OF ORGANIC WASTE

TECHNICAL FIELD

The invention provides a method for treating organic waste (and in particular, animal waste such as organic waste from a cow), and uses of a composition that is capable of generating a reactive species in a method of reducing biological degradation of organic waste, in the treatment of organic waste. The invention also provides organic waste treated by the methods of the invention and uses of this treated organic waste in downstream applications. The invention also provides a method for improving the production of volatile fatty acids (VFAs) and medium-chain carboxylic acids (MCCAs) during anaerobic digestion (AD) of organic waste.

BACKGROUND AND RELATED ART

In traditional livestock holdings, it is a known problem that organic waste degrades over time. It is also known that as organic waste degrades, the potential downstream utility of the waste diminishes, which consequently causes the value of the waste to fall. Although treatment methods to slow the rate of waste degradation are known, one must always consider the cost effectiveness of any treatment by balancing the initial cost of the treatment against the value the treatment imparts onto the waste for downstream utilities (e.g. use/resale as a fertiliser, industrial feedstock or biomass fuel). The present invention provides cost effective methods for treating organic waste by using a composition that is capable of generating a reactive species.

Biological degradation of organic waste can take many forms. In essence, biological degradation of organic waste is the breakdown by microbes (e.g. bacteria, fungi etc.) of valuable and useful larger organic compounds into less useful and less valuable smaller organic compounds, which ultimately are further degraded and lost from the waste as gases (e.g. $CH_4$, $NH_3$, $CO_2$, $N_2$ etc.). The larger organic compounds in non-degraded organic waste are useful and valuable because, for example, they can act as slow release sources of fertilising compounds and also as fibre sources to improve the condition, biodiversity and function of soil. There is therefore a need to provide methods for treating organic waste that reduce the biological degradation of organic waste.

Organic waste comprises fertilising compounds (e.g. carbon or nitrogen containing fertilising compounds such as amino acids, ammonium ($NH_4^+$) salts, nitrate ($NO_3^-$) salts, or nitrite ($NO_2^-$) salts). These fertilising compounds contribute to the ability of organic waste to fertilise soil when used downstream. Degradation of organic waste via processes such as denitrification causes the loss of certain fertilising compounds to the atmosphere, thus reducing the value of the waste in downstream applications as a fertiliser. There is therefore a need to reduce the loss of these fertilising compounds from organic waste in order to maintain the value of the organic waste in downstream applications.

Organic waste can also degrade by methanogenesis, which is the biological production of methane ($CH_4$). Methanogenesis is normally the final step in the biological decomposition of organic waste (or biomass) and is normally mediated by microorganisms from the Archaea domain, commonly called methanogens. Pathways for methanogenesis include: (1) reduction of carbon dioxide, (2) fermentation of acetate, and (3) dismutation (simultaneous reduction and oxidation of a molecule) of methanol or methylamines. The majority (~70%) of biologically produced methane originates from conversion of the methyl group of acetate to methane. There are at least the following two problems associated with methanogenesis.

First, methane is a greenhouse gas and therefore contributes to human-related global warming and climate change. In fact, pound for pound, methane is approximately 25 times stronger than carbon dioxide as a greenhouse gas, and the livestock and animal waste storage industries are the primary source of human related methane emissions (According to the US Environmental Protection Agency—https://www.epa.gov/ghgemissions/overview-greenhouse-gases #methane). Indeed, some countries financially penalise owners of livestock holdings if methane emissions are sufficiently high. There is therefore a need to treat organic waste to reduce methanogenesis in order to reduce greenhouse gas emissions from livestock holdings.

Second, the loss of carbon in the form of methane gas from organic waste causes at least two problems. First, loss of carbon causes a reduction in potential energy output of the waste if it has a potential use as a biofuel, or as a feedstock for biofuel production, e.g. by anaerobic digestion, or pyrolysis. In other words, the loss of carbon from the waste as methane means there is less combustible or reactable carbon in the remaining waste. Second, carbon containing organic compounds that are susceptible to decomposition to gaseous forms by methanogenesis can also be fertilising compounds—they fertilise soil when the organic waste is mixed with soil. Specifically, increasing soil organic carbon and fibre content is important to maintain and soil condition, biodiversity and functions. Reducing methanogenesis therefore also reduces loss of carbon containing fertilising compounds from the organic waste, thereby increasing the potential utility of the waste as a fertiliser and soil amendment. There is therefore a need to treat organic waste to reduce methanogenesis in order (i) to maximise the potential energy output of the waste if it is to be used as a biofuel, or as an industrial feedstock, and (ii) to reduce the loss of carbon containing fertilising compounds to maximise potential utility of the organic waste as a fertiliser and soil conditioner.

Another problem associated with the biological degradation of organic waste is so-called "crusting". As organic waste biodegrades, it can dry out and form a thick crust on its surface. Crusting is a nuisance to downstream users of the organic waste because it is more difficult to handle and in particular, less easy to spread over soil. There is therefore a need to reduce biological degradation of organic waste in order to reduce the crusting of organic waste as it biodegrades.

Previous methods of treating organic waste include acidifying the organic waste. Typically, "acidification" means lowering the pH level of the organic waste from its normal level (typically around pH 7) to a level below pH 6, and normally below around pH 5. To lower the pH level, the acidification agent used is typically a strong acid, such as hydrochloric acid, sulphuric acid, nitric acid, or the like. Formic acid, phosphoric acid, or the like may also be used. However, the use of a strong acid causes problems. For example, strong acids are often corrosive and harmful to both humans and livestock. This means that specialist storage equipment is needed (i) for the acid before it is used, and (ii) for the acidified waste, and additionally, specialist handlers of acid may also be needed. This adds cost and complexity to the process, thus reducing the overall cost effectiveness of the treatment, as discussed above.

Another problem with acidifying the organic waste is that its downstream utility as a fertiliser is hampered compared to non-acidified waste. This is because acidified waste causes acidification of soil, which can be damaging to crops and therefore undesirable. To counteract any unwanted acidification in the soil, additional alkali agent (e.g. lime) may need to be used, which again increases the overall cost of the treatment.

On a similar note, previous treatments (such as acidification) can leave harmful residues in the organic waste that can have negative impacts on the soil ecosystem if the treated waste is to be mixed with soil. There is therefore a need to provide treatments of organic waste that do not leave harmful residues in the treated waste.

Because methanogenesis is normally caused by microorganisms, traditional methods to counteract unwanted degradation of organic waste (e.g. by methanogenesis) have included administering oral antibiotics to the animal to reduce the amount of biological degrading microorganisms in the animal's digestive system. It is arguable whether this sort of treatment is effective, but it is always undesirably expensive. Another problem with this method is that public health authorities are often critical of the wide use of broad spectrum antibiotics because such use can contribute to antibiotic resistance. For example, the emergence of such antibiotic-resistant bacteria, or superbugs, such as MRSA, has become one of the major societal challenges globally.

The present invention aims to overcome at least the above problems.

Anaerobic digestion (AD) is a mixed microbial community process, which traditionally proceeds in four stages: hydrolysis, acidogenesis, acetogenesis, and methanogenesis. As a result of hydrolysis, complex organic matter (e.g., carbohydrates, proteins) and particulates are converted to monomers (e.g., sugars, amino acids). Subsequently, acidogenesis converts these monomers into volatile fatty acids (VFA) and medium-chain carboxylic acids (MCCA), ketones, alcohols, and hydrogen. The hydrolysis and acidogenesis steps are normally referred to as fermentation.

Increasingly, the use of a two-phase AD process where hydrolysis and acidification take place in one reactor (producing VFAs and MCCAs via chain elongation) while methanogenesis occurs in the other, is preferred. Such systems open the possibility of a mixed community fermentation process from organic wastes with recovery of high-value VFA/MCCA (e.g. butyrate, caproate, caprylate) in the first stage, and biogas production in the second from the remaining syntrophic and methanogenic substrates.

Traditionally, AD has been utilised for the production of methane only. However, there is increasing demand for the VFAs and MCCAs (that are produced after fermentation and before methanogenesis). The AD platform thus offers the potential as a core biorefinery technology not only for the generation of biogas, but also for the production of a variety of products from sustainably derived organic waste feedstocks. VFAs or MCCAs are high value chemical synthons used in the manufacture of pharmaceuticals, feed additives, green antimicrobials, biofuels and other bio-based products. It is estimated that the current market size for n-caproate, for example, is approximately 25,000 tonnes per year with a market value of $1000 to 3000 per tonne for unrefined and refined C6 respectively. Traditionally VFA/MCCAs are manufactured using petroleum however decreasing reserves and the environmental impact of such production processes make bio-refining an attractive alternative production strategy.

A key drawback with current approaches to anaerobic VFA/MCCA production is that the VFAs/MMCAs can be difficult to recover. Specifically, the AD process needs to be carefully controlled to avoid the VFAs/MMCAs from being converted to methane and thus lost. For instance, in order to inhibit VFA conversion to methane in the bioreactor (by methanogenesis), an approach is to ensure that the pH is maintained below 5.5. However, this low pH reduces the efficiency of the bacterial fermentation process and also adds complications to the design and use of the reactor.

The present invention also aims to overcome at least the above described efficiency problems with AD processes, e.g. by providing an AD process wherein the production of VFA/MCCA is more efficient.

DISCLOSURE OF THE INVENTION

The specification has been drafted into sections to aid readability. However, this does not mean that each section is to be read in isolation. To the contrary, otherwise unless specified, each section is to be read with cross-referencing to the other sections i.e. taking the entire specification as a whole. This means that a disclosure of, for example, a specific composition that is capable of generating a reactive species described in the "The compositions capable of generating a reactive species" section is intended to be read in combination with, for example, the term "composition" or "compositions capable of generating a reactive species" (and the like) in the context of the methods and/or uses of the invention described in the "Methods for Treating Organic Waste and Uses of the Compositions are Capable of Generating a Reactive Species, according to the invention" section. No artificial separation of embodiments is intended, unless explicitly stated.

SUMMARY OF THE INVENTION

The invention provides a method of reducing the biological degradation of organic waste in the treatment of organic waste using a composition that is capable of generating a reactive species. In particular, the invention provides a method of reducing methanogenesis and/or the loss of fertilising compounds from organic waste in the treatment of organic waste using a composition that is capable of generating a reactive species. Treatment according to the invention can also reduce crust formation on the organic waste. Treatments according to the invention can also reduce total biogas production (biogas includes methane gas generated by methanogenesis).

In other words, the invention provides the use of a composition that is capable of generating a reactive species, in a method of reducing biological degradation of organic waste in the treatment of organic waste. In particular, the invention also provides a use of a composition that is capable of generating a reactive species, in a method of reducing methanogenesis (or all biogas production) and/or the loss of fertilising compounds from organic waste in the treatment of organic waste. Treatment according to the invention can also reduce crust formation on the organic waste.

The present invention treats organic waste with a composition that is capable of generating a reactive species to reduce methanogenesis (or all biogas production) and/or to reduce the loss of fertilising compounds without acidifying the organic waste. As a result, the methods and uses of the present invention avoid using acids such as those described herein (i.e. none of hydrochloric acid, sulphuric acid, nitric acid, formic acid, phosphoric acid, propynoic acid or the like). This avoids the above described problems with acidifying organic waste.

Moreover, the present invention treats organic waste such that there are no residues created in the treated waste that would be harmful to biodiversity or ecosystem if mixed with soil. The treated organic waste also is more resistant to forming a crust on its surface. As a result, the usefulness and value of the treated organic waste is maximised, thereby improving the overall cost effectiveness of the treatment.

Also, the present invention does not require antibiotics to be administered to the animal. Accordingly, none of the above described undesirable impacts of antibiotic use is caused e.g. there is no contribution to antibiotic resistance and/or spreading of potentially harmful residues.

The invention also provides a method for treating organic waste with a composition that is capable of generating a reactive species. Specifically, the method for treating organic waste of the invention comprises contacting organic waste with a composition that is capable of generating a reactive species, wherein the composition comprises an oxidising agent, and wherein the reactive species is generated from a source of iodide ($I^-$) and the oxidising agent. Interaction of the reactive species with the organic waste reduces the biological degradation of the organic waste. In particular, the method reduces the overall production of biogas (in particular, it reduces the production of methane by methanogenesis) and also reduces the loss of useful and valuable organic compounds such as fertilising compounds (in particular, nitrogen-containing fertilising compounds such as ammonium compounds).

The invention also provides the organic waste that has been treated by a composition that is capable of generating a reactive species, in accordance with the invention. As explained herein, organic waste treated by methods of the invention has a different chemical and biological composition compared to organic waste not treated by methods of the invention (or untreated waste). In essence, the treatment reduces biological degradation of the waste to maintain the usefulness and value of the waste in downstream activities.

The invention also provides the downstream uses of the treated organic waste as a fertiliser; as a biomass fuel; as a soil conditioner; as a feedstock for anaerobic digestion; as a feedstock for biorefining; as a feedstock for production of animal feed (e.g. fish food); as a feedstock for production of algae; as a feedstock for production of animal protein (e.g. insects/worms etc); as a feedstock/substrate for chemical synthesis; as a feedstock for production of construction materials; as a feedstock for production of animal bedding; as a feedstock for the production of paper; or as a feedstock for thermal conversion processes such as pyrolysis or gasification. The invention also provides the downstream use of the treated organic waste as a feedstock for the manufacture of fertilisers, such as struvites, biochars, or phosphate salts.

The invention also provides a method for improving the production of volatile fatty acids (VFAs) and medium-chain carboxylic acids (MCCAs) during anaerobic digestion (AD) of organic waste, the method comprising contacting a composition that is capable of generating a reactive species with the organic waste.

General Definitions

The term "comprising" encompasses "including" as well as "consisting" e.g. a composition "comprising" X may consist exclusively of X or may include something additional e.g. X+Y.

The term "about" in relation to a numerical value x is optional and means, for example, x+10%. Unless specifically stated, a process comprising a step of mixing two or more components does not require any specific order of mixing. Thus, components can be mixed in any order. Where there are three components then two components can be combined with each other, and then the combination may be combined with the third component, etc.

The term "methanogenesis" means the bioproduction of methane gas (chemical formula=$CH_4$) by microorganisms e.g. archaea, bacteria or other living organisms.

The term "fertiliser" or "fertilising compounds" means any substance that may be added to soil to make it more fertile. Typical fertilising compounds are carbon and/or nitrogen containing compounds such as amino acids, ammonium salts, nitrate ($NO_3^-$) salts or nitrite ($NO_2^-$) salts. Other known fertilising compounds such as phosphorous containing compounds and potassium containing compositions (e.g. Potash), as also encompassed by "fertiliser" or "fertilising compounds". Exemplary phosphorous-containing fertilising compounds include sources of phosphate ($[PO_4]^{3-}$) e.g. fluorapatite.

The term "acid" generally means a substance that when placed in water will dissociate into an anion (negatively charged species) by donating a proton ($H^+$) to the water, or a substance that can accept electrons. This ability of an acid to dissociate is quantified by pKa. The lower the pKa, the stronger the acid i.e. the easier the acid will dissociate into an anion and a proton. As used herein, the term "acid" means any substance having a pKa in water of below 8 (more particularly below pKa 6, more particularly below pKa 4, more particular below pKa 2, more particularly below pKa 0). As used herein, "acid" includes at least hydrochloric acid, sulphuric acid, nitric acid, formic acid, phosphoric acid, propynoic acid, or the like.

The term "acidify" or "acidification" means reducing the pH level of a substance to below its original level by addition of an acidifying agent such as an acid. As used herein, treating organic waste by "acidification" means that the treatment reduces the pH of the organic waste in order to be effective. In particular, treatment by "acidification" reduces the pH level of the organic waste by e.g. 2 pH units, 1.5 pH units, 1 pH unit, 0.5 pH units.

The term "biological degradation" or "biodegradation" or an equivalent thereof, means the breakdown by biological organisms (e.g. microbes such as bacteria, fungi etc.) of valuable and useful larger organic compounds into less useful and less valuable smaller organic compounds, and ultimately into gases (e.g. $CH_4$, $NH_3$, $CO_2$, $N_2$ etc.). The gases produced by biological degradation of organic waste are called "biogas" or "biogases".

The term "organic waste" means biodegradable waste comprising organic matter. The organic waste can biologically degrade into simple molecules such as carbon dioxide, water, and/or methane. The term "organic waste" encompasses organic waste from an animal, a human, from fungi (e.g. mushrooms such as spent mushroom compost), and food waste etc. The "organic waste" may be in any form, and in particular, any degree of liquidity/solidity. Liquid waste (e.g. urine, blood), solid (e.g. manure, vegetable peelings) and semi-liquids (e.g. slurry, offal) are encompassed.

The term "livestock" means domesticated animals that are traditionally kept on farms. Common examples of livestock include cow, pig, horse, sheep, hen, chicken, turkey, duck, deer, or goat.

The term "slurry" means a semi-liquid mixture of animal waste and water, typically containing fine particles of animal waste.

The term "composition that is capable of generating a reactive species" means that the composition is comprised of components that can react in situ or ex situ to create a reactive species that can react further with the organic waste. The reactive species can be generated entirely between the components comprised in the composition, and/or the reactive species can be generated between a component of the composition and a component in the organic waste. It is the interaction of the reactive species with the organic waste that reduces the biological degradation of the organic waste, as described herein.

The term "volatile fatty acid" (or VFA) are fatty acids with fewer than six carbon atoms. Exemplary VFAs include formate, acetate, propionate, butyrate, isobutyrate, valerate, and isovalerate (or their acid equivalent). The term "acid equivalent" means its acid form e.g. the acid form of butyrate is butyric acid. Particular VFAs include butyrate and isobutyrate.

The term "medium-chain carboxylic acid" (or MCCA) are fatty acids with 6 to 12 carbon atoms. Exemplary MCCAs include caproate, caprylate, caprate, and laurate (or their acid equivalent). Again, the term "acid equivalent" means its acid form e.g. the acid form of caproate is caproic acid. Particular MCCAs include caproate and caprylate.

BRIEF DESCRIPTION OF THE FIGURES

The invention will now be described, by way of example only, with reference to the accompanying figures.

FIG. 2 shows that treatments according to the invention dramatically reduce biological degradation of organic waste to methane gas (via methanogenesis).

Figure 1:
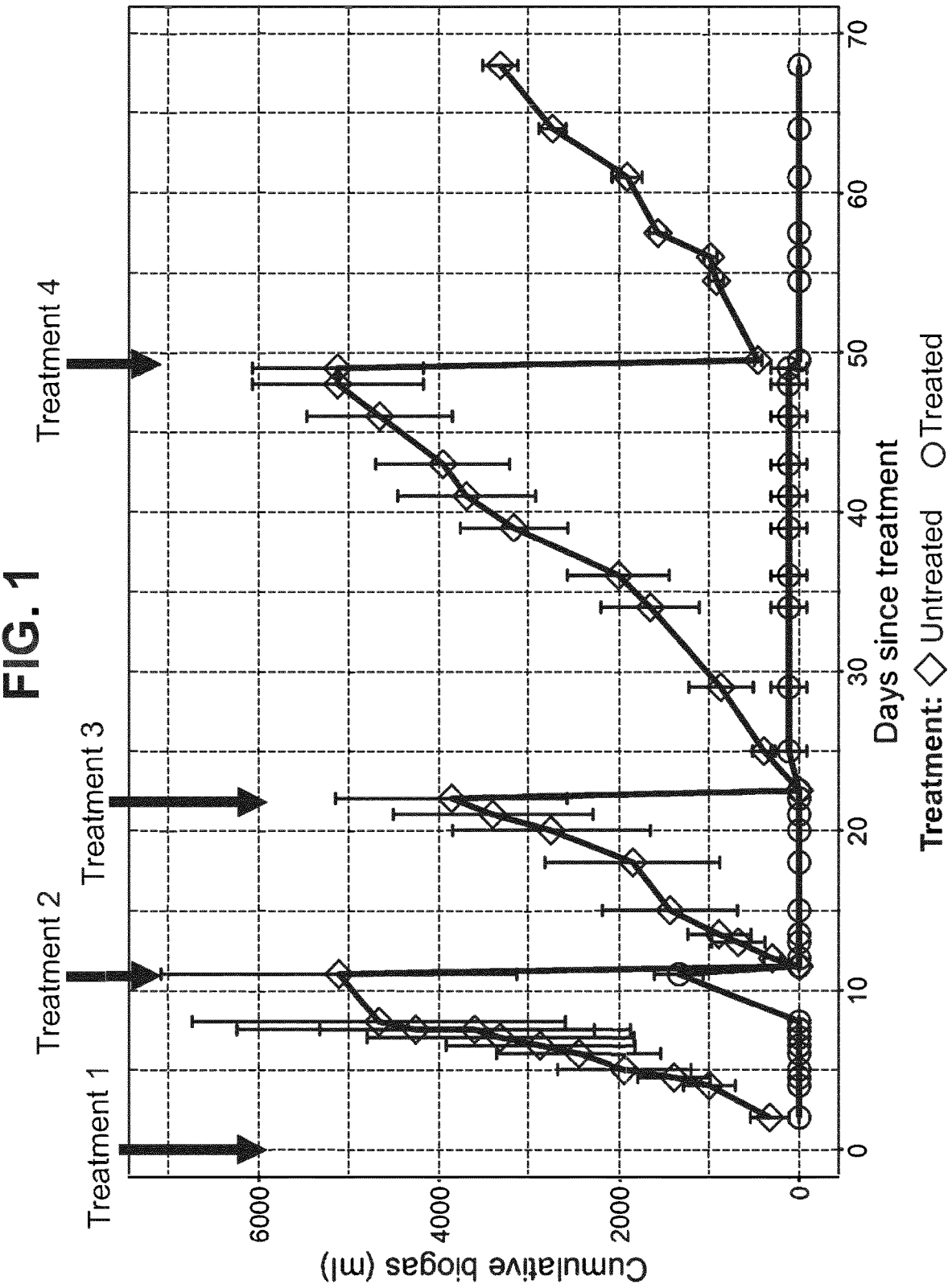
FIG. 1 shows that treatments according to the invention dramatically reduces the cumulative amount of biogas produced by the organic waste.

The figures are described in more detail in the Example section.

The Compositions Capable of Generating a Reactive Species As described above, when used in methods of treating organic waste, the compositions that are capable of generating a reactive species described herein reduce the biological degradation of organic waste. In particular treatments according to the invention can reduce total biogas production, in particular, the production of methane gas by methanogenesis and/or can reduce the loss of fertilising compounds from organic waste, in particular nitrogen-containing fertilising compounds. Treatment according to the invention can also reduces crust formation on the organic waste.

The reactive species generated in treatments according to the invention can specifically inhibit microbes that produce biogas (typically, methane-producing microbes such as methanogens) and can trap nitrogen in the organic waste in non-volatile forms, while allowing the beneficial microbial breakdown of manure solids and hygenisation of manure to proceed. This means that some solids in the organic waste can partially decomposed as normal, releasing plant available nutrients and generating a homogenous, easy-to-manage slurry. However, the valuable and useful nutrients are not lost to gaseous emissions and are instead contained within the treated organic waste for downstream applications. This not only reduces greenhouse gas emissions, but also maintains high levels of fertilising compounds and organic matter content for onward fertiliser and biofuel usage.

The method for treating organic waste of the invention also utilises a composition that is capable of generating a reactive species. In the method for treating organic waste of the invention, the composition comprises an oxidising agent and the reactive species is generated from a source of iodide ($I^-$) and the oxidising agent.

Prior methods include the treatment of organic waste with an acid, which must acidify the waste in order to be effective. The treatments provided by the invention utilise a composition that is capable of generating a reactive species instead of acidifying the organic waste. The compositions used in the treatments of the invention therefore do not acidify the organic waste in order to provide an effective treatment. In other words, the compositions used in the treatments of the invention are substantially free of any acid. In particular, the compositions used in the treatments of the invention comprises less than 10 weight %, less than 5 weight %, less than 2 weight %, less than 1 weight %, less than 0.5 weight %, or less than 0.1 weight %, of any acid having a pKa in water of less than pKa 8. The compositions used in the treatments of the invention can also be free of any acid having a pKa in water of less than pKa 8.

As discussed above, the use of a composition that is capable of generating a reactive species, in methods according to the invention, provides an effective treatment without acidifying the organic waste below its normal pH. In other words, the composition that is capable of generating a reactive species does not acidify the organic waste during treatment. The pH of organic waste varies depending on its source (e.g. it is typically between pH 6 and 8). For example, when considering animal waste, poultry manure can be pH >7, cow around pH 7, pig around pH 6.2-6.7, which can also change naturally during storage. The compositions used in the treatments of the invention can reduce the pH level of the organic waste during treatment by less than two pH units, more specifically, less than 1.5 pH units, more specifically less than 1 pH unit, more specifically less than 0.5 pH units, more specifically, less than 0.25 pH units.

Composition used in accordance with the invention are not acids (e.g. not formic acid or phosphoric acid or the like), and certainly not strong acids such as hydrochloric acid, sulphuric acid, nitric acid, or the like. In one embodiment, the compositions of the invention do not comprise any of hydrochloric acid, sulphuric acid, nitric acid, formic acid, phosphoric acid, propynoic acid or the like. On the contrary, the pH of 1 g of the composition in a litre of water can be greater than pH 4, pH 4.5, pH 5, pH 5.5, pH 6, preferably greater than pH 4.

The treatments of the invention reduce the loss of key compounds that are useful in downstream uses of the organic waste. Specifically, the treatments of the present invention reduce the loss of fertilising compounds from organic waste. In particular, the treatments of the present invention reduce the loss of nitrogen-containing fertilising compounds. Thus, the treatments of the present invention can reduce the loss of nitrogen-containing fertilising compounds to ammonia. The reactive species generated in the treatments of the invention can reduce the loss of fertilising compounds in organic waste. The treatments of the present invention can reduce the release of ammonia from the organic waste. In some embodiments, the reactive species generated in the treatments of the invention is not a gas. For example, the reactive species generated in the treatments of the invention can be a solid, a liquid, a solvated ion, or a mixture of solvated ions. More specifically, in some embodiments the reactive species generated in the treatments of the invention is not an oxidising agent, e.g. not an oxidising gas, and in particular, is not oxygen gas.

In some embodiments, the compositions used in the treatments described herein do not comprise elemental iodine.

The composition that is capable of generating a reactive species can comprise an oxidising agent. The reactive species can be generated from the oxidising agent and another component. The "another component" can be present in the organic waste and/or in the composition. In one embodiment, the "another component" is a source of iodide ($I^-$), which is any substance able to provide iodide ions ($I^-$).

The source of iodide ($I^-$) can be present in the organic waste, especially if the organic waste is derived from an ecosystem/area having rich sources of iodide salts (e.g. high iodide diets). In this embodiment, the reactive species can be generated from the oxidising agent in the composition and the source of iodide already present in the organic waste. The amount of iodide in the organic waste will, of course, vary depending on the ecosystem. Typically, to provide an effective treatment, the ratio of iodide ions to oxidising agent can be between $1(I^-):0.1$ (oxidising agent) and $1(I^-):100$ (oxidising agent) during the treatment of the organic waste. More specifically, the ratio of iodide ions to oxidising agent can be between $1(I^-):0.1$ (oxidising agent) and $1(I^-):50$ (oxidising agent) during the treatment of the organic waste. More specifically, the ratio of iodide ions to oxidising agent can be between $1(I^-):0.1$ (oxidising agent) and $1(I^-):25$ (oxidising agent) during the treatment of the organic waste. In particular, the ratio can be between $1(I^-):3$ (oxidising agent) and $1(I^-):15$ (oxidising agent), more particularly, between $1(I^-):5$ (oxidising agent) and $1(I^-):15$ (oxidising agent), between $1(I^-):8$ (oxidising agent) and $1(I^-):15$ (oxidising agent), between $1(I^-):0.1$ (oxidising agent) and $1(I^-):10$ (oxidising agent), between $1(I^-):8$ (oxidising agent) and $1(I^-):12$ (oxidising agent), or between $1(I^-):10$ (oxidising agent) and $1(I^-):12$ (oxidising agent), during treatment of the organic waste. The disclosure include all endpoints being combinable.

In addition to any source of iodide in the organic waste, the source of iodide can also be present in the composition. In other words, the composition can comprise a source of iodide ($I^-$) and an oxidising agent. In this embodiment, the reactive species can be generated from (i) the oxidising agent in the composition, and also (ii) the source of iodide in the composition and/or the source of iodide in the organic waste (but in this case (ii) is optional). Typically, to provide an effective treatment, the ratio of iodide ions to oxidising agent in the composition can be between $1(I^-):0.1$ (oxidising agent) and $1(I^-):25$ (oxidising agent), more particularly between $1(I^-):0.1$ (oxidising agent) and $1(I^-):15$ (oxidising agent), between $1(I^-):0.1$ (oxidising agent) and $1(I^-):10$ (oxidising agent), and in particular, between $1(I^-):0.1$ (oxidising agent) and $1(I^-):3$ (oxidising agent), between $1(I^-):1$ (oxidising agent) and $1(I^-):5$ (oxidising agent), between $1(I^-):2$ (oxidising agent) and $1(I^-):4$ (oxidising agent). The ratio of iodide ions to oxidising agent in the composition can also be selected from the group consisting of: $1(I^-):0.1$ (oxidising agent); $1(I^-):0.4$ (oxidising agent); $1(I^-):1.1$ (oxidising agent); $1(I^-):2.5$ (oxidising agent); $1(I^-):10$ (oxidising agent); and $1(I^-):25$ (oxidising agent). As above, the disclosure include all endpoints being combinable.

Sources of iodide are any substance able to provide iodide ions ($I^-$). Exemplary sources of iodide include the group consisting of: sodium iodide (NaI), potassium iodide (KI), lithium iodide (LiI), caesium iodide (CsI), hydrogen iodide (HI), and rhodium iodide ($RhI_3$). Combinations of such exemplary sources of iodide may also be used. Potassium iodide (KI) is a preferred source of iodide.

Oxidising agents are substances that are capable of oxidising other substances, e.g. cause a loss in electrons. The oxidising agents described herein are not in the gaseous state at room temperature and atmospheric pressure. In addition, the oxidising agents described herein can be substances comprising at least two chemical elements. The oxidising agents described herein fall into two main categories: (i) sources of peroxide ($O_2^{2-}$), or (ii) oxidising agents from the group consisting of: a source of iodate ($[IO_3]^-$) (e.g. sodium iodate, potassium iodate), a source of permanganate ($[MnO_4]^-$) (e.g. sodium permanganate, potassium permanganate), and combinations thereof. The oxidising agent can also be a combination of agents in categories (i) and (ii).

When the oxidising agent is selected from above list (ii), potassium permanganate is a preferred oxidising agent.

Sources of peroxide means any substance able to provide peroxide ions ($O_2^{2-}$). Sources of peroxide are preferred oxidising agents of the invention, particularly, hydrogen peroxide ($H_2O_2$). Other exemplary sources of peroxide include the group consisting of: sodium peroxide, lithium peroxide, peroxide releasing citric acid, peroxide releasing Vitamin C, peroxide salts (e.g. barium oxide), sodium perborate, oxygen releasing pseudo peroxides (e.g. superoxides, dioygenals, ozones, and ozonides), organic peroxides (e.g. peroxy acids, acyl halides, and aliphatic peroxides), a peroxide-releasing percarbonate (e.g. sodium percarbonate, potassium percarbonate or a slow-releasing form of a peroxide-releasing percarbonate), a peroxide-urea adduct, and an enzymatic reaction between a sugar and its appropriate oxidoreductase (e.g. an enzymatic reaction between glucose and glucose oxidase, and/or between galactose and galactose oxidase, and/or between alcohol and alcohol oxidase, and/or between cholesterol and cholesterol oxidase). Combinations of these sources of peroxide with each other, or indeed hydrogen peroxide may also be used.

The compositions described herein can also comprise a source of urea. Source of urea means any substance able to provide urea. Exemplary sources of urea are selected from the list consisting of: urea, a peroxide-urea adduct, proteins, amino acids, urine, and combinations thereof. Preferably, the source of urea is urea.

Indeed, the source of peroxide and urea may instead arise from a hydrogen peroxide-urea adduct, instead of from two separate and distinct species. This is a preferred embodiment of the invention.

As described above, the compositions described herein can comprise a source of iodate ($[IO_3]^-$), in particular potassium iodate. Additionally, the compositions described herein can comprise a hydrogen peroxide-urea adduct such that the composition comprises a source of iodate ($[IO_3]^-$) (in particular potassium iodate) and a hydrogen peroxide-urea adduct.

In a preferred embodiment, the composition comprises a source of iodide (preferably potassium iodide) and hydrogen peroxide. When the composition comprises both a source of iodide and hydrogen peroxide, a preferred ratio of iodide ions (e.g. from sodium or potassium iodide) to hydrogen peroxide in the composition is between $1(I^-):0.1$ (hydrogen peroxide) and $1(I^-):25$ (hydrogen peroxide), more particularly between $1(I^-):0.1$ (hydrogen peroxide) and $1(I^-):15$ (hydrogen peroxide), between $1(I^-):0.1$ (hydrogen peroxide) and $1(I^-):10$ (hydrogen peroxide), between $1(I^-):0.1$ (hydrogen peroxide) and $1(I^-):5$ (hydrogen peroxide), between $1(I^-):5$ (hydrogen peroxide) and $1(I^-):10$ (hydrogen peroxide). More specifically, the ratio of iodide ions to hydrogen peroxide in the composition is selected from the group consisting of: $1(I^-):0.1$ (hydrogen peroxide); $1(I^-):0.4$ (hydrogen peroxide); $1(I^-):1.1$ (hydrogen peroxide); $1(I^-):2.5$ (hydrogen peroxide); $1(I^-):10$ (hydrogen peroxide); and $1(I^-):25$ (hydrogen peroxide). Preferably, the ratio of iodide ions in the composition to hydrogen peroxide is $1(I^-):4.2$ (hydrogen peroxide). As above, the disclosure include all endpoints being combinable.

The composition can also comprise a source of thiocyanate ($[SCN]^-$), which is any substance able to provide a thiocyanate ion. Exemplary sources of thiocyanate include the group consisting of: sodium thiocyanate, potassium thiocyanate, lithium thiocyanate, caesium thiocyanate, hydrogen thiocyanate, rhodium thiocyanate, and allyl isothiocyanate. Combinations of these sources of thiocyanate may also be used.

A specific composition that is capable of generating a reactive species in accordance with the invention comprises source of peroxide (e.g. hydrogen peroxide), a source of thiocyanate, and a source of iodide. More specifically, this composition can comprise sodium or potassium iodide, hydrogen peroxide and sodium or potassium thiocyanate. The ratio of iodide ions to hydrogen peroxide in these compositions can be between $1(I^-)$ 0.1 (hydrogen peroxide) and $1(I^-):5$ (hydrogen peroxide), more particularly between $1(I^-):0.1$ (hydrogen peroxide) and $1(I^-):4$ (hydrogen peroxide), between $1(I^-):0.1$ (hydrogen peroxide) and $1(I^-):10$ (hydrogen peroxide), or between $1(I^-):25$ (hydrogen peroxide). As above, the disclosure include all endpoints being combinable.

Other specific compositions comprise a peroxide-urea adduct and/or a peroxide-releasing percarbonate (in particular, sodium percarbonate) as the source of peroxide. These specific composition can further comprise a source of thiocyanate and/or a source of iodide (e.g. potassium iodide). For example specific compositions include, (i) a peroxide-urea adduct and a source of thiocyanate; (ii) a peroxide-urea adduct, a source of thiocyanate, and a source of iodide (e.g. potassium iodide); (iii) a peroxide-urea adduct and a source of iodide (e.g. potassium iodide); (iv) a peroxide-urea adduct, a peroxide-releasing percarbonate (in particular, sodium percarbonate), a source of thiocyanate, and a source of iodide (e.g. potassium iodide); (v) a peroxide-urea adduct, a peroxide-releasing percarbonate (in particular, sodium percarbonate), and a source of iodide (e.g. potassium iodide); (vi) a peroxide-releasing percarbonate (in particular, sodium percarbonate) and a source of thiocyanate; (vii) a peroxide-releasing percarbonate (in particular, sodium percarbonate), a source of thiocyanate, and a source of iodide (e.g. potassium iodide); (viii) a peroxide-releasing percarbonate (in particular, sodium percarbonate) and a source of iodide (e.g. potassium iodide); (ix) a peroxide-urea adduct and a peroxide-releasing percarbonate (in particular, sodium percarbonate); and (x) a peroxide-urea adduct, a peroxide-releasing percarbonate (in particular, sodium percarbonate), and a source of thiocyanate. The ratio of iodide ions to peroxide in these embodiments can be between, $1(I^-):0.1$ (peroxide) and $1(I^-):25$ (peroxide), $1(I^-):0.1$ (peroxide) and $1(I^-):15$ (peroxide), more particularly between $1(I^-):0.1$ (peroxide) and $1(I^-):10$ (peroxide), between $1(I^-):5$ (peroxide) and $1(I^-):10$ (peroxide).

Another specific composition that is capable of generating a reactive species in accordance with the invention comprises another oxidising agent (e.g. a source of permanganate ($[MnO_4]^-$), which is preferably potassium permanganate), a source of thiocyanate, and a source of iodide. This composition can comprise sodium or potassium iodide, sodium or potassium thiocyanate, and sodium or potassium permanganate. The ratio of iodide ions to permanganate ($[MnO_4]^-$) in this composition can be between $1(I^-):0.1$ (permanganate) and $1(I^-):10$ (permanganate).

The compositions used in treatments according to the invention are capable of generating a reactive species. Specific types of reactive species generated according to the invention can be reactive oxygen species (reactive species containing an oxygen atom) and/or reactive oxygen halide species (reactive species containing an oxygen atom and a halide). An exemplary reactive species generated by the compositions of the invention is an iodophor. An iodophor can comprise an iodo-thiocyanate complex such as those selected from the groups consisting of one or more of: ISCN, $I_2SCN$, $I_2(SCN)_2$, $IOH(SCN)_2$, $I_3OH(SCN)_2$, $I_3OH(SCN)_3$, $I_4(SCN)_4OH$, and $I_5(SCN)_5$. Other reactive species include sources of hypoiodite ($IO^-$). Another reactive species include sources of hypothiocyanite ($[OSCN]^-$).

The composition that is capable of generating a reactive species can also comprise a cyanate compound such as potassium cyanate or thiocyanogens.

When used in the methods and uses described herein, the amount of composition used can be between about 0.01 mg and about 0.1 mg per gram of organic waste, or between about 0.1 mg and about 1.0 mg per gram of organic waste, or between about 1.0 mg and about 5.0 mg per gram of organic waste, or between about 5 mg and about 10 mg per gram of organic waste, or between about 10 mg and about 20 mg per gram of organic waste, or between about 20 mg and about 50 mg per gram of organic waste, or between about 50 mg and about 100 mg per gram of organic waste, or between about 100 mg and about 200 mg per gram of organic waste, or between about 200 mg and about 300 mg per gram of organic waste, or between about 300 mg and about 400 mg per gram of organic waste, or between about 400 mg and about 500 mg per gram of organic waste, or between about 500 mg and about 600 mg per gram of organic waste, or between about 600 mg and about 700 mg per gram of organic waste, or between about 700 mg and about 800 mg per gram of organic waste, or between about 800 mg and about 900 mg per gram of organic waste, or between about 900 mg and about 1000 mg per gram of organic waste. In certain embodiments, the amount of composition used can be between 0.3 mg per gram of organic waste and about 1.5 mg per gram of organic waste. In particular, the amount of composition used is selected from the group consisting of: about 0.33 mg per gram of organic waste; about 0.67 mg per gram of organic waste; and about 1.33 mg per gram of organic waste. Preferably, the amount of composition used is about 1.33 mg per gram of organic waste. For the avoidance of doubt, all combinations of the above endpoints are also disclosed.

The amount of composition used can also be about 2.66 mg per gram of organic waste. The amount of composition used can also be about 3.39 mg per gram of organic waste.

The amount of composition used can also be between 0.01 kg and about 0.1 kg per tonne of organic waste; or between about 0.1 kg and 1 kg per tonne of organic waste, or between about 1 kg and about 5 kg per tonne of organic waste, or between about 5 kg and about 10 kg per tonne of organic waste, or between about 10 kg and about 20 kg per tonne of organic waste, or between about 20 kg and about 50 kg per tonne of organic waste, or between about 50 kg and about 100 kg per tonne of organic waste. For example, the amount of composition used can be tween about 0.01 kg and about 0.1 kg per tonne of organic waste. The amount of composition used can be tween about 0.1 kg and 1 kg per tonne of organic waste. The amount of composition used can be tween about 1 kg and about 5 kg per tonne of organic waste. The amount of composition used can be tween about 10 kg and about 20 kg per tonne of organic waste.

The composition that is capable of generating a reactive species may be in the form of one or more capsules or tablets. These tablets/capsules may be entirely separate, i.e. where the tablets/capsules are administered and mixed into the waste separately. Alternatively, some/all of the individual components of the composition may be in the form of an all-in-one tablet/capsule, wherein the various components of the tablet/capsule are separated from each other such that the reactive species cannot form before it is mixed into the organic waste. Once administered, the all-in-one tablet/capsule can be dispersed into the organic waste. Alternatively, the components of the composition may not be in the form of a one or more tablets or one or more capsules, and instead the components of the compositions are added and mixed into the organic waste in some other form. The present invention envisages at least these possible options.

The Organic Waste

As described above, organic waste is biodegradable (i.e. it is biologically degradable) waste comprising organic matter. Organic waste can be broken down into simple molecules and ultimately into gases such as carbon dioxide, ammonia, water, nitrogen and/or methane.

In a preferred embodiment of the invention, the organic waste is animal waste, and in particular, waste from livestock. Specific waste from livestock treated in methods and uses according to the invention is waste from a cow, pig, horse, or sheep, or in particular, waste from a cow e.g. slurry.

Methods for Treating Organic Waste and Uses of the Compositions that are Capable of Generating a Reactive Species, According to the Invention As described above, the invention provides a method for treating organic waste comprising contacting organic waste with a composition that is capable of generating a reactive species, wherein the composition comprises an oxidising agent and the reactive species is generated form a source of iodide ($I^-$) and the oxidising agent. Interaction of the reactive species with the organic waste reduces the biological degradation of the organic waste. In particular, the method can reduce the overall production of biogas (in particular, it reduces the production of methane by methanogenesis) and can also reduce the loss of useful and valuable organic compounds such as fertilising compounds (in particular, nitrogen-containing fertilising compounds).

The invention also provides a method of reducing the biological degradation of organic waste in the treatment of organic waste using a composition that is capable of generating a reactive species. Particular forms of biological degradation reduced in accordance with the present invention include reducing biogas production (in particular, the production of methane by methanogenesis) and/or reducing the loss of fertilising compounds (in particular nitrogen-containing fertilising compounds) from organic waste. Treatment according to the invention can also reduce crust formation on the organic waste.

In some embodiments, "contacting" the organic waste with a composition that is capable of generating a reactive species involves adding the composition to the organic waste and then mixing the waste/composition mixture to evenly distribute the composition in the organic waste. Evenly distributing the composition in the organic waste will maximise the beneficial effects of the composition.

The treatments of the present invention generally do not require any artificial heating and/or artificial pressurisation to be effective. More specifically, the treatments of the present invention can be carried out at ambient temperature and ambient pressure. However, for the avoidance of any doubt, the treatments of the invention can be successfully utilised when the treatment is carried out with artificial heating and/or artificial pressurisation.

The treatments of the present invention also do not require any physical and/or mechanical pre-treatments (such as chopping, grinding, milling and ultrasound) to be effective. However, for the avoidance of any doubt, the treatments of the invention can be successfully utilised when such physical and/or mechanical pre-treatments are employed.

The treatments of the present invention also do not require any physico-chemical and/or chemical pre-treatments to be effective, including use of chemicals such as alkalis and ozone. However, for the avoidance of any doubt, the treatments of the invention can be successfully utilised when such physico-chemical and/or chemical pre-treatments are employed.

The treatments of the present invention also do not require any biological and/or enzymatic pre-treatments using specialized microorganisms and/or enzyme treatments to be effective. However, for the avoidance of any doubt, the treatments of the invention can be successfully utilised when such biological and/or enzymatic pre-treatments using specialized microorganisms and/or enzyme treatments are employed.

The treatments of the present invention also do not require any microwave disruption to be effective. However, for the avoidance of any doubt, the treatments of the invention can be successfully utilised when microwave disruption is employed.

As mentioned above, the composition may be in the form of entirely separate components, or an all-in-one capsule/tablet. The individual components of the composition can be added to the organic waste simultaneously or at separate times so long as the reactive species can be generated. Regardless of the administrable form, it is preferred for the some/all of the individual components in the composition to be mixed in situ, that is to say, some/all of the individual components in the composition come into contact with each other only when mixed into the animal waste. The purpose of this is to ensure that the reactive species is generated only when the composition has been mixed with the organic waste. However, the individual components of the composition can be mixed together before coming into contact with the organic waste so long as the composition contains/can still generate sufficient reactive species when mixed with the organic waste to provide the effects of the invention.

After the organic waste and the composition that is capable of generating a reactive species have been contacted (and/or mixed), the treated organic waste can be stored until the treated organic waste is to be used downstream. Storage can take place for as long (or short) as needed, and is often determined by the downstream use of the waste. For example, storage can take place for as short as at least 2 days, or as long as at least 24 months. If the waste is to be used in an anaerobic digestion plant, storage may be as short as a week (or two weeks, or three weeks, or a month). If the waste is to be used as a fertiliser, storage may take place over a longer period of time, e.g. over the winter season. Storage can also take place for at least 1 months, at least 2 months, at least 3 months, at least 4 months, at least 5 months, at least 8 months, at least, 12 months, at least 14 months, at least 16 months, at least 18 months, at least 20 months, or at least 22 months. For example, storage can take place for at least 1 month. Storage can take place for at least 3 months. Storage can take place for at least 5 months. Storage can take place for at least 12 months. Storage can take place for at least 16 months. Storage can take place for at least 18 months. Regardless of the duration of storage, using the composition in accordance with the invention imparts improved properties onto the organic waste compared to organic waste not treated according to the invention (or untreated waste).

The rate of biological degradation of the organic waste typically depends on the conditions of storage, e.g. the temperature. The higher the temperature, the faster the rate of biological degradation. Treatment of the present invention therefore may need to be repeated at certain intervals of storage in order to "top up" the level of composition to ensure that the beneficial effects of the invention are maintained. Treatment according to the present invention may therefore comprise checking the rate of biological degradation (e.g. methanogenesis) at regular intervals (e.g. every day, every 2 days, every week, every two weeks, every month, every two months, every 3 months etc.) and retreating the organic waste in order to maintain the beneficial effects of the invention.

The composition that is capable of generating a reactive species is able to reduce biodegradation of organic waste to gas over time. In some embodiments, methanogenesis of the organic waste is reduced. Reducing methanogenesis means that, over an equal time period (e.g. during treatment of the organic waste), less methane escapes from a set amount of organic waste that has been treated in accordance with the invention compared to an equal amount of organic waste that has not been treated according to the invention. This may also be described as "delaying" methanogenesis i.e. methanogenesis of waste treated in accordance with the invention lags behind methanogenesis of waste not treated in accordance with the invention (or untreated waste). Both the rate of methanogenesis and the total amount of methanogenesis produced can be beneficially affected (i.e. reduced) by the compositions in accordance with the invention.

As mentioned, the treatments according to the invention can reduce the production of biogas of organic waste. Typically, the amount of biogas produced by waste treated according to the invention will be less than about 10%, about 20%, about 30%, about 40%, about 50%, about 60%, about 70%, about 80%, about 90%, about 95%, about 98%, or about 100%, compared to organic waste not treated according to the invention (or even untreated waste) that has been stored for the same time. For example, the amount of biogas produced by waste treated according to the invention can be less than about 10%, compared to organic waste not treated according to the invention (or even untreated waste) that has been stored for the same time. The amount of biogas produced by waste treated according to the invention can be less than about 50%, compared to organic waste not treated according to the invention (or even untreated waste) that has been stored for the same time. The amount of biogas produced by waste treated according to the invention can be less than about 70%, compared to organic waste not treated according to the invention (or even untreated waste) that has been stored for the same time. The amount of biogas produced by waste treated according to the invention can be less than about 90%, compared to organic waste not treated according to the invention (or even untreated waste) that has been stored for the same time. The amount of biogas produced by waste treated according to the invention can be less than about 100%, compared to organic waste not treated according to the invention (or even untreated waste) that has been stored for the same time.

Reducing methanogenesis can mean reducing the rate of methanogenesis (methane production) in organic waste by more than about 10%, about 20%, about 30%, about 40%, about 50%, about 60%, about 70%, about 80%, about 90%, about 95%, about 98%, or about 100% compared to organic waste not treated according to the invention (or untreated waste). For example, the rate of methanogenesis (methane production) in organic waste can be reduced by more than about 10%, compared to organic waste not treated according to the invention (or untreated waste). The rate of methanogenesis (methane production) in organic waste can be reduced by more than about 30%, compared to organic waste not treated according to the invention (or untreated waste). The rate of methanogenesis (methane production) in organic waste can be reduced by more than about 50%, compared to organic waste not treated according to the invention (or untreated waste). the rate of methanogenesis (methane production) in organic waste can be reduced by more than about 70%, compared to organic waste not treated according to the invention (or untreated waste). The rate of methanogenesis (methane production) in organic waste can be reduced by more than about 90%, compared to organic waste not treated according to the invention (or untreated waste). The rate of methanogenesis (methane production) in organic waste can be reduced by more than about 100%, compared to organic waste not treated according to the invention (or untreated waste). When treated according to the invention, the total amount of methane produced over a 24 hour time period can be reduced by greater than about 10%, about 20%, about 30%, about 40%, about 50%, about 60%, about 70%, about 80%, about 90%, about 95%, or about 100% compared to organic waste not treated according to the invention (or untreated waste). For example, the total amount of methane produced over a 24 hour time period can be reduced by greater than about 10%, compared to organic waste not treated according to the invention (or untreated waste). The total amount of methane produced over a 24 hour time period can be reduced by greater than about 30%, compared to organic waste not treated according to the invention (or untreated waste). The total amount of methane produced over a 24 hour time period can be reduced by greater than about 50%, compared to organic waste not treated according to the invention (or untreated waste). The total amount of methane produced over a 24 hour time period can be reduced by greater than about 70%, compared to organic waste not treated according to the invention (or untreated waste). The total amount of methane produced over a 24 hour time period can be reduced by greater than about 90%, compared to organic waste not treated according to the invention (or untreated waste). More specifically, the total amount of methane produced over a 24 hour time period can be reduced by 10% to 90%, 20% to 80%, 30% to 70%, 40% to 60% or 45% to 55% compared to waste not treated according to the invention (or untreated waste). For example, the total amount of methane produced over a 24 hour time period can be reduced by 10% to 90%, compared to waste not treated according to the invention (or untreated waste). The total amount of methane produced over a 24 hour time period can be reduced by 20% to 80%, compared to waste not treated according to the invention (or untreated waste). The total amount of methane produced over a 24 hour time period can be reduced by 30% to 70%, compared to waste not treated according to the invention (or untreated waste). The total amount of methane produced over a 24 hour time period can be reduced by 40% to 60% compared to waste not treated according to the invention (or untreated waste). The total amount of methane produced over a 24 hour time period can be reduced by 45% to 55% compared to waste not treated according to the invention (or untreated waste). For the avoidance of doubt, all combinations of above endpoints are also disclosed.

Additionally (or independently), the composition that is capable of generating a reactive species can reduce the loss of fertilising compounds from the organic waste. In some embodiments, the composition reduces the loss of carbon containing and/or nitrogen containing compounds such as amino acids, ammonium salts, nitrate ($NO_3^-$) salts and nitrite ($NO_2^-$) salts. These compounds contribute to the effectiveness of organic waste as a fertiliser so reducing the loss of such fertilising compounds increases the value of the organic waste over time compared to organic waste not treated according to the invention (or untreated waste). Nitrogen compounds within organic waste can degrade into gasses such as ammonia ($NH_3$) or nitrogen gas ($N_2$). $NH_3$ is precursor of nitrous oxide, which is a greenhouse gas, so reducing its loss from the degradation of nitrogen containing compounds is also a beneficial effect of the invention.

Methods and uses according to the invention can mean that treated organic waste has a significantly higher amount of fertilising compounds retained compared to untreated waste. Organic waste treated according to the invention can have more than about 10%, about 20%, about 30%, about 40%, about 50%, about 60%, about 70%, about 80%, about 90%, about 95%, about 100%, about 110%, about 120%, about 130%, or about 150% of fertilising compounds compared to waste not treated according to the invention (or untreated waste). For example, organic waste treated according to the invention can have more than about 10% of fertilising compounds compared to waste not treated according to the invention (or untreated waste). Organic waste treated according to the invention can have more than about 30% of fertilising compounds compared to waste not treated according to the invention (or untreated waste). Organic waste treated according to the invention can have more than about 50% of fertilising compounds compared to waste not treated according to the invention (or untreated waste). Organic waste treated according to the invention can have more than about 70% of fertilising compounds compared to waste not treated according to the invention (or untreated waste). Organic waste treated according to the invention can have more than about 90% of fertilising compounds compared to waste not treated according to the invention (or untreated waste). Organic waste treated according to the invention can have more than about 110% of fertilising compounds compared to waste not treated according to the invention (or untreated waste). Organic waste treated according to the invention can have more than about 130% of fertilising compounds compared to waste not treated according to the invention (or untreated waste). Organic waste treated according to the invention can have more than about 150% of fertilising compounds compared to waste not treated according to the invention (or untreated waste). More specifically, organic waste treated according to the invention can have between 10% to 90%, 20% to 80%, 30% to 70%, 40% to 60% or 45% to 55%, 90% to 150%, 90% to 130%, 100% to 140%, 100% to 200%, 200% to 400%, 400% to 600%, 400% to 800%, 600% to 800%, fertilising compounds compared to waste not treated according to the invention (or untreated waste). For example, organic waste treated according to the invention can have more than between 10% to 90% of fertilising compounds compared to waste not treated according to the invention (or untreated waste). Organic waste treated according to the invention can have more than between 90% to 150% of fertilising compounds compared to waste not treated according to the invention (or untreated waste). Organic waste treated according to the invention can have more than between 100% to 200% of fertilising compounds compared to waste not treated according to the invention (or untreated waste). For the avoidance of doubt, all combinations of above endpoints are also disclosed.

The methods and uses according to the invention reduce the biodegradation of organic waste to gas. Biodegradation of waste causes a loss in mass of the waste over time because mass is lost as gasses. The methods and uses according to the invention can therefore reduce the loss in mass of the organic waste by more than about 10%, about 20%, about 30%, about 40%, about 50%, about 60%, about 70%, about 80%, about 90%, or about 95% compared to waste not treated according to the invention (or untreated waste). For example, methods and uses according to the invention can reduce the loss in mass of the organic waste by more than about 10%, compared to waste not treated according to the invention (or untreated waste). Methods and uses according to the invention can reduce the loss in mass of the organic waste by more than about 30%, compared to waste not treated according to the invention (or untreated waste). Methods and uses according to the invention can reduce the loss in mass of the organic waste by more than about 50%, compared to waste not treated according to the invention (or untreated waste). Methods and uses according to the invention can therefore reduce the loss in mass of the organic waste by more than about 70%, compared to waste not treated according to the invention (or untreated waste). Methods and uses according to the invention can reduce the loss in mass of the organic waste by more than about 90%, compared to waste not treated according to the invention (or untreated waste). More specifically, the methods and uses according to the invention can reduce the loss in mass of the organic waste by between 10% to 90%, 20% to 80%, 30% to 70%, 40% to 60% or 45% to 55% compared to waste not treated according to the invention (or untreated waste). For example, the methods and uses according to the invention can reduce the loss in mass of the organic waste by between 10% to 90%, compared to waste not treated according to the invention (or untreated waste). The methods and uses according to the invention can reduce the loss in mass of the organic waste by between 30% to 70%, compared to waste not treated according to the invention (or untreated waste). The methods and uses according to the invention can reduce the loss in mass of the organic waste by between 45% to 55% compared to waste not treated according to the invention (or untreated waste). For the avoidance of doubt, all combinations of above endpoints are also disclosed.

As there is reduced biodegradation of valuable and useful organic compounds in the organic waste, the energy output (e.g. if the organic waste is used downstream in an anaerobic digester) of organic waste treated according to the invention is improved compared to the energy output of organic waste not treated according to the invention (or untreated waste) that has been stored for the same time. Typically energy output from waste treated according to the invention will be increased compared to organic waste not treated according to the invention (or untreated waste) by more than about 10%, about 20%, about 30%, about 40%, about 50%, about 60%, about 70%, about 80%, about 90%, about 95%, or about 98%. For example, energy output from waste treated according to the invention can be increased compared to organic waste not treated according to the invention (or untreated waste) by more than about 10%, Energy output from waste treated according to the invention can be increased compared to organic waste not treated according to the invention (or untreated waste) by more than about 30%. Energy output from waste treated according to the invention can be increased compared to organic waste not treated according to the invention (or untreated waste) by more than about 50%, Energy output from waste treated according to the invention can be increased compared to organic waste not treated according to the invention (or untreated waste) by more than about 70%. Energy output from waste treated according to the invention can be increased compared to organic waste not treated according to the invention (or untreated waste) by more than about 90%.

The beneficial effects of the invention mean that organic waste treated in accordance with the invention have improved utility compared to untreated waste. For example, the treated waste may be used more effectively in applications such as a fertiliser; as a biomass fuel; as a soil conditioner; as a feedstock for anaerobic digestion; as a feedstock for biorefining; as a feedstock for production of animal feed (e.g. fish food); as a feedstock for production of algae; as a feedstock for production of animal protein (e.g. insects/worms etc); as a feedstock/substrate for chemical synthesis; as a feedstock for production of construction materials; as a feedstock for production of animal bedding; as a feedstock for the production of paper; or as a feedstock for thermal conversion processes such as pyrolysis or gasification.

Moreover, the compositions that are capable of generating a reactive species used in accordance with the invention are cheap to obtain, less harmful to livestock and the environment, and easier to use, compared to other waste treatment substances (e.g. with acids). In particular, unlike other waste treatment substances (e.g. acids), the compositions that are capable of generating a reactive species used in accordance with the invention do not require any particularly specialist storage equipment to prevent against corrosion or toxicity, nor do they need a specialised handler. The combination of these factors means that the compositions used in accordance with the invention are overall far more cost effective than other treatments.

Additionally, the compositions that are capable of generating a reactive species used in accordance with the invention do not leave any harmful residues or harmful substances in the treated waste. This makes the waste treated in accordance with the invention more useful to be spread over soil compared to waste treated with some other methods (e.g. acids).

For example, treated waste that has been acidified would reduce the pH level of soil if it was spread as a fertiliser. Either this would be prima facie unsuitable for spreading on soil, meaning that the commercial value of the treated waste as a fertiliser would be low, or the user would have to also spread alkali agents (e.g. lime) over the soil to counteract the reduced pH level caused by spreading the acidified treated waste. Adding alkali agents (e.g. lime) would contribute further costs to the user, and would add complexity and time to the process of fertilising fields, thus reducing the overall cost effectiveness of the treatment.

The compositions that are capable of generating a reactive species used in accordance with the invention are also beneficial because they do not produce any harmful residues that would limit its downstream use.

The Organic Waste Treated in Accordance with the Invention

As explained above, organic waste that is treated by the compositions that are capable of generating a reactive species according to the invention biologically degrades less compared to waste not treated according to the invention (or untreated waste). For example, biological degradation by methanogenesis and loss of fertilising compounds is reduced compared to organic waste not treated according to the invention (or untreated waste). Treatment according to the invention can also reduce crust formation on the organic waste compared to untreated waste. As a result, the chemical and biological composition of organic waste treated according to the invention is different from the chemical and biological composition of untreated organic waste, or organic waste treated by different methods (e.g. acidification).

For example, organic waste treated in accordance with the invention has a different chemical composition compared to untreated waste. First, the invention requires the addition of a composition that is capable of generating a reactive species (i.e. a new chemical substance) to the waste. Untreated waste, or waste treated by other methods (e.g. acidification) would not have such a composition present. As already explained, a consequence of adding the composition in accordance with the invention is that biological degradation of the waste is reduced compared to waste not treated according to the invention (or untreated waste). For example, there is reduced loss of fertilising compounds from the waste (e.g. there is a reduced loss of carbon, nitrogen and/or phosphate containing compounds such as amino acids, ammonium salts, nitrate ($NO_3^-$) salts or nitrite ($NO_2^-$) salts). Accordingly, not only does organic waste treated according to the invention differ from untreated waste as a result of the presence of the composition that is capable of generating a reactive species, but it is also enriched with fertilising compounds compared to untreated waste that would have degraded at a normal rate. Typically, and as mentioned above, organic waste treated according to the invention will contain more than about 100% (in particular more than about 130%) the amount of fertilising compounds (in particular nitrogen-containing fertilising compounds) compared to waste not treated according to the invention (or untreated waste).

Additionally, the composition that is capable of generating a reactive species reduces methanogenesis i.e. it reduces the rate of and the total loss of carbon containing methane ($CH_4$). By reducing methanogenesis, waste treated according to the invention has an increased carbon content compared to untreated waste that would have degraded at a normal rate. This means that organic waste treated in accordance with the invention is more combustible (produces more energy as a biomass fuel), is a better substrate for biofuel by, for example, anaerobic digestion or pyrolysis, and has more carbon-containing fertilising compounds. As a result of reduced biological degradation, organic waste treated in accordance with the invention has a more bulky and fibrous structure compared to untreated waste that will degrade, meaning that it is far better at improving soil structure when mixed with soil.

This all means that organic waste treated according to the invention is more valuable and useful compared to untreated waste as it will (i) remain more enriched with fertilising compounds and carbon compared to untreated waste over time, and (ii) have a bulkier and more fibrous structure. Treatment according to the invention can also reduce crust formation on the organic waste compared to untreated waste.

In view of the above, when used as a fertiliser, organic waste treated in accordance to the invention increases crop yield. Typically, crop yield, which is normally measured by analysing the dry mass of the harvested crop, will increase by more than about 5%, about 10%, about 15%, about 20%, about 25%, about 30%, about 40%, or about 50%, compared to crops where the fertiliser used is organic waste not treated according to the invention (or untreated waste).

The present invention provides the uses of the treated organic waste of the invention as a fertiliser; as a biomass fuel; as a soil conditioner; as a feedstock for anaerobic digestion; as a feedstock for biorefining; as a feedstock for production of animal feed (e.g. fish food); as a feedstock for production of algae; as a feedstock for production of animal protein (e.g. insects/worms etc); as a feedstock/substrate for chemical synthesis; as a feedstock for production of construction materials; as a feedstock for production of animal bedding; as a feedstock for the production of paper; or as a feedstock for thermal conversion processes such as pyrolysis or gasification. A particularly preferred use of the treated organic waste is as a fertiliser. Another particularly preferred use of the treated organic waste is as a biomass fuel. Another particularly preferred use of the treated organic waste is as an anaerobic digestion feedstock. These uses will be improved compared to uses of untreated waste as a result of the improved properties of the waste treated in accordance with the invention.

The invention also provides the downstream use of the treated organic waste as a feedstock for the manufacture of fertilisers, such as struvites, biochars, or phosphate salts.

For example, organic waste treated in accordance with the invention can produce greater than about 20%, about 30%, about 40% about 50%, about 60%, about 70%, about 80%, about 90%, or about 100% more biogas when used as an anaerobic digestion feedstock/substrate compared to waste not treated according to the invention (or untreated waste). Organic waste treated in accordance with the invention can produce greater than about 20% more biogas when used as an anaerobic digestion feedstock/substrate compared to waste not treated according to the invention (or untreated waste). Organic waste treated in accordance with the invention can produce greater than about 40% more biogas when used as an anaerobic digestion feedstock/substrate compared to waste not treated according to the invention (or untreated waste). Organic waste treated in accordance with the invention can produce greater than about 60% more biogas when used as an anaerobic digestion feedstock/substrate compared to waste not treated according to the invention (or untreated waste). Organic waste treated in accordance with the invention can produce greater than about 80% more biogas when used as an anaerobic digestion feedstock/substrate compared to waste not treated according to the invention (or untreated waste). Organic waste treated in accordance with the invention can produce greater than about 100% more biogas when used as an anaerobic digestion feedstock/substrate compared to waste not treated according to the invention (or untreated waste).

As mentioned above, treatments according to the invention can cause energy output from waste treated according to the invention will be increased compared to organic waste not treated according to the invention (or untreated waste) by more than about 10%, about 20%, about 30%, about 40%, about 50%, about 60%, about 70%, about 80%, about 90%, about 95%, or about 98%. For example, treatments according to the invention can cause energy output from waste treated according to the invention will be increased compared to organic waste not treated according to the invention (or untreated waste) by more than about 10%. Treatments according to the invention can cause energy output from waste treated according to the invention will be increased compared to organic waste not treated according to the invention (or untreated waste) by more than about 30%. Treatments according to the invention can cause energy output from waste treated according to the invention will be increased compared to organic waste not treated according to the invention (or untreated waste) by more than about 50%. Treatments according to the invention can cause energy output from waste treated according to the invention will be increased compared to organic waste not treated according to the invention (or untreated waste) by more than about 70%. Treatments according to the invention can cause energy output from waste treated according to the invention will be increased compared to organic waste not treated according to the invention (or untreated waste) by more than about 90%.

Method for Improving the Production of VFAs and MCCAs During the Anaerobic Digestion of Organic Waste As noted above, the invention also provides a method for improving the production of volatile fatty acids (VFAs) and medium-chain carboxylic acids (MCCAs) during anaerobic digestion (AD) of organic waste, the method comprising contacting a composition that is capable of generating a reactive species with the organic waste.

For the avoidance of any doubt, the composition that is capable of generating a reactive species described in these methods are the compositions capable of capable of generating reactive species that are described above. Thus, the invention includes methods for improving the production of VFAs and MCCAs described herein, using compositions described elsewhere and for other methods. The invention also includes combinations of such methods, for example, methods and uses for treating organic waste described herein can occur in the methods related to AD. For example, uses of compositions for reducing methanogenesis described herein can occur in the methods for improving the production of volatile fatty acids (VFAs) and medium-chain carboxylic acids (MCCAs) during anaerobic digestion (AD) of organic waste.

In general, AD comprises the following steps: (i) hydrolysis, (ii) acidogenesis, (iii) acetogenesis, and then (iv) methanogenesis. Hydrolysis involves breaking down large, complex polymers like carbohydrates, cellulose, proteins and fats by hydrolytic enzymes into simple monomer e.g. sugars, amino acids and fatty acids. Acidogenesis involves breaking down these simple monomers into VFAs and MCCAs. Acetogenesis involves breaking down the products of acidogenesis into acetic acid, releasing hydrogen and carbon dioxide. Methanogenesis is defined above, and is the bioproduction of methane gas by e.g. microorganisms such as methanogens. All of these steps can be carried out in one reactor. Alternatively, more than one reactor can be used. For instance, fermentation (hydrolysis and acidogenesis) can take place in one reactor, followed by acetogenesis and methanogenesis in a separate reactor.

The method can comprise fermenting the organic waste. Fermenting the organic waste can include subjecting the organic waste to hydrolysis and/or acidogenesis. In addition, the AD of organic waste can comprise subjecting the organic waste to methanogenesis.

As noted above, the composition that is capable of generating a reactive species is contacted with the organic waste. "Contacted" can mean adding the composition that is capable of generating a reactive species to the organic waste or it can mean adding the organic waste to the composition that is capable of generating a reactive species. The composition that is capable of generating a reactive species can be mixed into the organic waste (or vice versa). The composition that is capable of generating a reactive species can be mixed into the organic waste so as to distribute to composition substantially evenly in the organic waste (or vice versa).

The composition that is capable of generating a reactive species can be contacted with the organic waste whilst the organic waste is in an anaerobic digestion bioreactor. The composition that is capable of generating a reactive species can be contacted with the organic waste prior to the organic waste entering an anaerobic digestion bioreactor, e.g. the composition can be contacted with the organic waste feedstock.

The composition that is capable of generating a reactive species can be contacted with the organic waste before the methanogenesis stage of AD. The composition that is capable of generating a reactive species can be contacted with the organic waste before the acetogenesis and methanogenesis stages of AD. More specifically, the composition that is capable of generating a reactive species can be contacted with the organic waste before the fermentation stage i.e. before the organic waste is fermented.

As noted above, the compositions described herein reduce methanogenesis. Without wishing to be bound by theory, it is thought that the compositions are capable of generating a reactive species that can inhibit methanogens. Thus, in these methods, the composition that is capable of generating a reactive species can inhibit methanogens. The composition that is capable of generating a reactive species can reduce methanogenesis. The composition that is capable of generating a reactive species can therefore reduce the biodegradation of the organic waste to methane gas. Doing this reduces the degradation of VFAs and MCCAs to methane.

The method can further comprise collecting the VFAs and MCCAs. More specifically, the method can further comprise collecting the VFAs and MCCAs after fermentation i.e. separating, collecting and removing the VFAs and MCCAs from the fermented organic waste. Particular VFAs and MCCAs that can be collected include butyrate, caproate, and caprylate (or their equivalent acid forms). The method can comprise collecting the VFAs and MCCAs after fermenting the organic waste. The method can comprise collecting the VFAs and MCCAs after fermenting the organic waste and before subjecting the organic waste to methanogenesis.

AD can be a continuous process wherein organic waste feedstock is continuously added to an AD bioreactor. Alternatively, the organic waste in the AD bioreactor can be periodically "topped up" i.e. the amount of organic waste in the AD bioreactor can be periodically increased.

The use of the composition in the method for anaerobic digestion (AD) of organic waste permits the method to be conducted without artificially lowering the pH. It is therefore a more efficient method for the production of volatile fatty acids (VFAs) and medium-chain carboxylic acids (MCCAs) during anaerobic digestion (AD) of organic waste. Specifically, the compositions described herein selectively inhibit methanogenesis of the organic waste, which inhibits the loss of VFAs and MCCAs. There is therefore no need for the method of conducting AD to be carried out at a pH below 5.5 in order to inhibit methanogenesis, as is required in some prior art AD methods.

Thus, the methods of the present invention can be carried out without artificially lowering the pH of the organic waste (e.g. by the addition of acid). More specifically, the methods of the present invention can be carried out without artificially lowering the pH of the organic waste to reduce methanogenesis. The methods of the present invention can be carried out at a pH of above pH 5.5. The methods of the present invention can be carried out at between pH 5.5 and pH 8. The methods of the present invention can be carried out at between pH 5.5 and pH 7.5. The methods of the present invention can be carried out at between pH 5.5 and pH 7. The methods of the present invention can be carried out at between pH 6 and pH 8. The methods of the present invention can be carried out at between pH 6 and pH 7.5. The methods of the present invention can be carried out at between pH 6 and pH 7. The methods of the present invention can be carried out at between pH 6.5 and pH 8. The methods of the present invention can be carried out at between pH 6.5 and pH 7. The methods of the present invention can be carried out at approximately pH 7. The methods of the present invention can be carried out at pH 7.

The method can increase the yield of VFAs and MCCAs collected from the method compared to a method that does not utilise a composition that is that is capable of generating a reactive species to the organic waste. Specifically, the yield of VFAs and MCCAs collected by the methods of the invention can be increased by at least 5% (compared to a method that does not utilise a composition of the invention). More specifically, the yield of VFAs and MCCAs collected by the methods of the invention can be increased by at least 10% (compared to a method that does not utilise a composition of the invention). More specifically, the yield of VFAs and MCCAs collected by the methods of the invention can be increased by at least 20% (compared to a method that does not utilise a composition of the invention). The yield of VFAs and MCCAs collected by the methods of the invention can be increased by between 5% and 50% (compared to a method that does not utilise a composition of the invention). The yield of VFAs and MCCAs collected by the methods of the invention can be increased by between 5% and 40% (compared to a method that does not utilise a composition of the invention). The yield of VFAs and MCCAs collected by the methods of the invention can be increased by between 5% and 30% (compared to a method that does not utilise a composition of the invention). The yield of VFAs and MCCAs collected by the methods of the invention can be increased by between 5% and 25% (compared to a method that does not utilise a composition of the invention). The yield of VFAs and MCCAs collected by the methods of the invention can be increased by between 10% and 50% (compared to a method that does not utilise a composition of the invention). The yield of VFAs and MCCAs collected by the methods of the invention can be increased by between 10% and 40% (compared to a method that does not utilise a composition of the invention). The yield of VFAs and MCCAs collected by the methods of the invention can be increased by between 10% and 30% (compared to a method that does not utilise a composition of the invention). The yield of VFAs and MCCAs collected by the methods of the invention can be increased by between 10% and 25% (compared to a method that does not utilise a composition of the invention). The yield of VFAs and MCCAs collected by the methods of the invention can be increased by between 15% and 25% (compared to a method that does not utilise a composition of the invention). The yield of VFAs and MCCAs collected by the methods of the invention can be increased by between about 20% (compared to a method that does not utilise a composition of the invention).

As will be known in the art, the loading rate of organic waste into an AD reactor is commonly described in terms of the "grams of organic waste volatile solids" or "g of organic waste VS". The "grams of organic waste VS" is measured in accordance with APHA, 2005 Standard Methods for the Examination of Water and Wastewater.

The organic waste can be loaded into an AD reactor at a loading rate of between about 0.1 g and about 15 g of organic waste VS per L of the AD reactor per day. The organic waste can be loaded into an AD reactor at a loading rate of between about 0.1 g and about 10 g of organic waste VS per L of the AD reactor per day. The organic waste can be loaded into an AD reactor at a loading rate of between about 0.1 g and about 7.5 g of organic waste VS per L of the AD reactor per day. The organic waste can be loaded into an AD reactor at a loading rate of between about 0.1 g and about 5 g of organic waste VS per L of the AD reactor per day. The organic waste can be loaded into an AD reactor at a loading rate of between about 0.1 g and about 3 g of organic waste VS per L of the AD reactor per day. The organic waste can be loaded into an AD reactor at a loading rate of between about 0.1 g and about 2 g of organic waste VS per L of the AD reactor per day. The organic waste can be loaded into an AD reactor at a loading rate of between about 0.1 g and about 1 g of organic waste VS per L of the AD reactor per day. The organic waste can be loaded into an AD reactor at a loading rate of between about 0.2 g and about 0.8 g of organic waste VS per L of the AD reactor per day. The organic waste can be loaded into an AD reactor at a loading rate of between about 0.3 g and about 0.75 g of organic waste VS per L of the AD reactor per day. The organic waste can be loaded into an AD reactor at a loading rate of between about 0.3 g and about 0.6 g of organic waste VS per L of the AD reactor per day. The organic waste can be loaded into an AD reactor at a loading rate of about 0.5 g of organic waste VS per L of the AD reactor per day. As noted above, the composition can be contacted with the feedstock before being loaded into the AD reactor. Alternatively, or additionally, the composition can be contacted with the feedstock after the organic waste is loaded into the AD reactor.

As noted above, the composition can comprise a source of iodide (I-) and the oxidising agent. More specifically, the composition can comprise a source of iodide (I-) and the source of peroxide ($O_2^{2-}$). A particular composition for use in these methods comprises urea-peroxide. In addition, or in the alternative, the composition for use in these methods comprises potassium iodide. The composition for use in these methods can therefore comprise urea-peroxide and potassium iodide.

When used, the amount of oxidising agent (in particular, urea-peroxide) used can be between about 0.5 and about 10 g per kg of organic waste. The amount of oxidising agent (in particular, urea-peroxide) used can be between about 0.5 and about 7.5 g per kg of organic waste. The amount of oxidising agent (in particular, urea-peroxide) used can be between about 0.5 and about 5 g per kg of organic waste. The amount of oxidising agent (in particular, urea-peroxide) used can be between about 0.5 and about 4 g per kg of organic waste. The amount of oxidising agent (in particular, urea-peroxide) used can be between about 1 and about 4 g per kg of organic waste. The amount of oxidising agent (in particular, urea-peroxide) used can be between about 1 and about 3.5 g per kg of organic waste. The amount of oxidising agent (in particular, urea-peroxide) used can be between about 1.5 and about 3.5 g per kg of organic waste. The amount of oxidising agent (in particular, urea-peroxide) used can be between about 2 and about 3.5 g per kg of organic waste. The amount of oxidising agent (in particular, urea-peroxide) used can be between about 2 and about 3 g per kg of organic waste. The amount of oxidising agent (in particular, urea-peroxide) used can be between about 2 and about 2.5 g per kg of organic waste. The amount of oxidising agent (in particular, urea-peroxide) used can be about 2.4 g per kg of organic waste.

When used, the amount of a source of iodide (I-) (in particular, potassium iodide) used can be between about 0.1 and 4 g per kg of organic waste. The amount of a source of iodide (I-) (in particular, potassium iodide) used can be between about 0.1 and 3 g per kg of organic waste. The amount of a source of iodide (I-) (in particular, potassium iodide) used can be between about 0.1 and 2 g per kg of organic waste. The amount of a source of iodide (I-) (in particular, potassium iodide) used can be between about 0.1 and 1.5 g per kg of organic waste. The amount of a source of iodide (I-) (in particular, potassium iodide) used can be between about 0.1 and 1.0 g per kg of organic waste. The amount of a source of iodide (I-) (in particular, potassium iodide) used can be between about 0.1 and 0.75 g per kg of organic waste. The amount of a source of iodide (I-) (in particular, potassium iodide) used can be between about 0.1 and 0.5 g per kg of organic waste. The amount of a source of iodide (I-) (in particular, potassium iodide) used can be between about 0.2 and 0.5 g per kg of organic waste. The amount of a source of iodide (I-) (in particular, potassium iodide) used can be between about 0.2 and 0.4 g per kg of organic waste. The amount of a source of iodide (I-) (in particular, potassium iodide) used can be between about 0.2 and 0.3 g per kg of organic waste. The amount of a source of iodide (I-) (in particular, potassium iodide) used can be about 0.266 g per kg of organic waste.

It will be understood that the invention has been described by way of example only and modifications may be made whilst remaining within the scope and spirit of the invention.

EXAMPLES

Example 1—Assessing the Effect of Treatments of the Invention on Cumulative Biogas Production Six 25 L drums containing 16 kg of slurry were used to assess the effects of the treatments of the invention. The slurry used was from Holstein Friesian, grass-fed, dairy cows.

Three drums received no positive treatment. Instead, these were treated only with water and act as a control. Three other drums received treatment according to the invention with a composition that is capable of generating a reactive species.

The composition used in the treatment composed of a hydrogen peroxide urea adduct and potassium iodide. The concentration of composition was 2.66 g per kg of slurry—based on 2.4 g of hydrogen peroxide-urea adduct and 0.265 g potassium iodide. This corresponds to a ratio of 4.2:1 of hydrogen peroxide to iodide ions.

All of the drums were sealed with modified lids to which gas bags were attached thus allowing collection of any produced biogas. Biogas is given off as the slurry biologically degrades.

The volume of biogas produced was measure via water displacement.

The results of this example are shown in FIG. 1. FIG. 1 shows that treatments according to the invention dramatically reduce the cumulative amount of biogas produced by the organic waste. This demonstrates that the treatments of the invention dramatically reduce biological degradation of biological waste.

FIG. 1 also shows that the reduction in biological degradation is maintained over a long period of time, which is enhanced by re-treating of the waste. The slurry was re-treated three times as shown in FIG. 1. Each cycle of treatment is called a "phase", thus FIG. 1 shows four phases of treatment.

Figure 2:
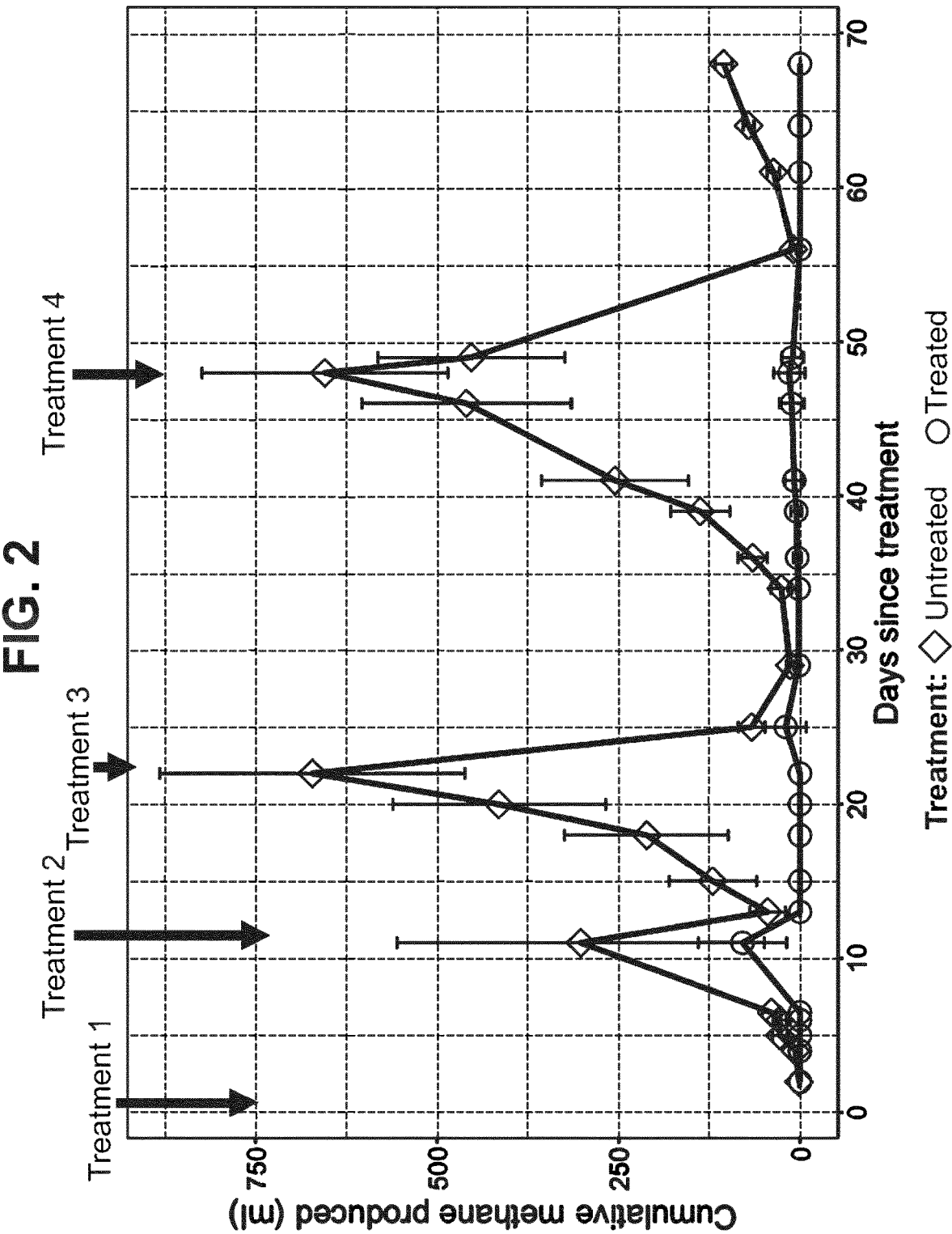
FIG. 2 shows that the biogas measured in FIG. 1 comprises methane. Thus.

When the volume of biogas was measured, a subsample was removed to determine its methane content using gas chromatography. FIG. 2 shows these results and confirms that methane production is dramatically reduced over time period measures. Accordingly, treatment according to the invention is shown to reduce methanogenesis of the organic waste.

Example 2—Assessing the Effect of Treatments of the Invention on Ammonium Compound Concentration The data in this example was generated from the same batch of slurry as in Example 1. Accordingly, the treatment composition, control and treatment conditions are the same as for Example 1.

At the end of each phase of treatment, just prior to re-treatment, slurry within 25 L drums was well mixed and subsamples removed. This was immediately mixed with 4 volumes of an extractant (2M KCl) for one hour before being filtered.

Figure 3:
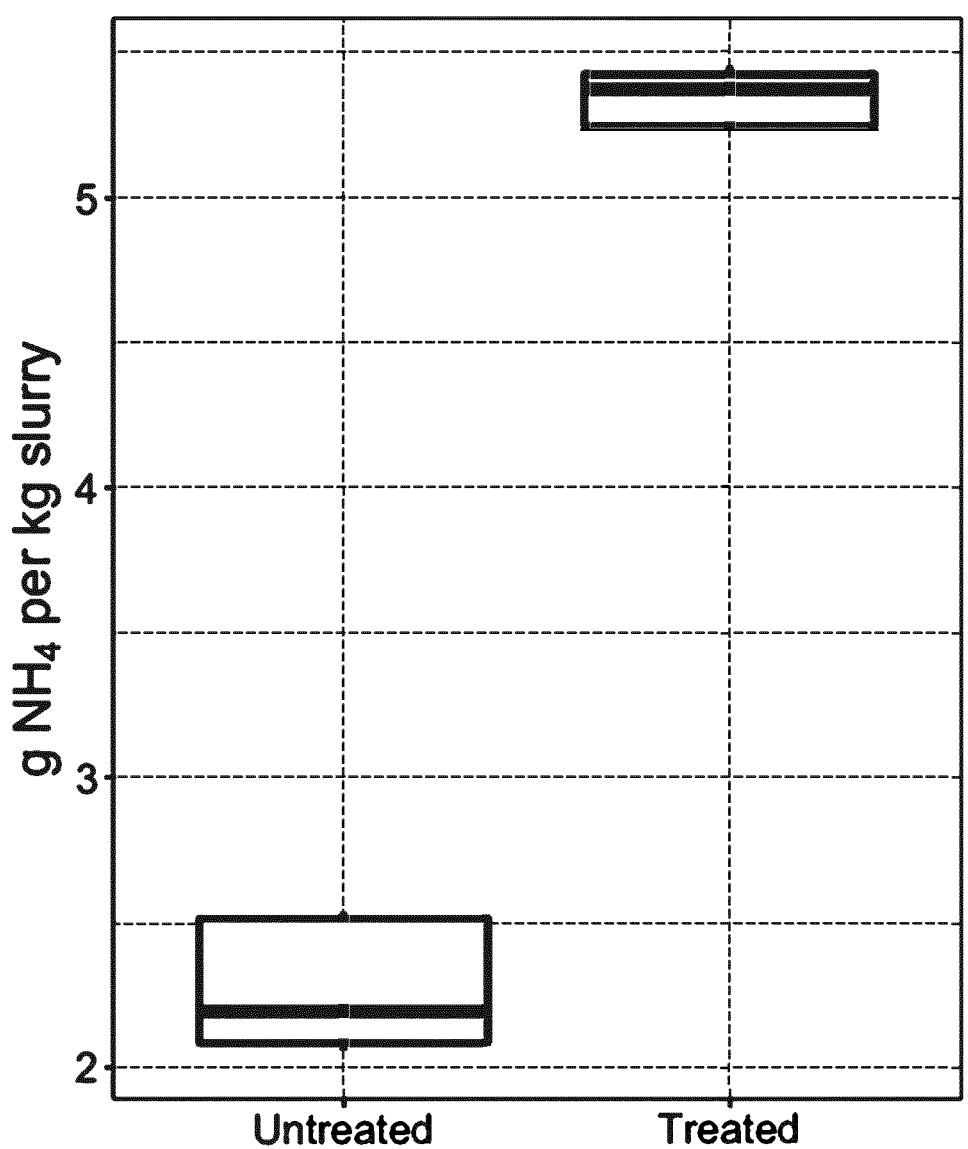
FIG. 3 shows that organic waste treated in accordance with the invention maintained higher levels of ammonium compounds compared to untreated waste.

Ammonium concentrations within the filtrate were measured using the colorimetric indophenol blue method, as implemented in the Merck Ammonium Test. FIG. 3 shows the ammonium concentration results for the subsamples removed at the end of the experiment, i.e. after the fourth phase of treatment.

FIG. 3 shows that organic waste treated in accordance with the invention maintained higher levels of ammonium compounds compared to untreated waste. Ammonium containing compounds are examples of nitrogen containing fertilising compounds. Preventing the degradation of such compounds improves the utility and value of the organic waste in downstream applications e.g. as a fertiliser.

Example 3—Assessing the Fertilising Ability of the Organic Waste Treated in Accordance with the Invention The data in this example was generated from the same batch of slurry as in Example 1. Accordingly, the treatment composition, control and treatment conditions are the same as for Example 1.

1 kg of slurry was removed from each 25 L drum at day 48 (end of phase 3) in order to assess impacts of the treatments on the fertilising ability of the treated waste in terms of plant growth.

Three treatments were tested:
1) No amendment
2) Amendment with untreated slurry
3) Amendment with treated slurry 10 replicate pots per treatment were filled with 1 kg of top soil (+/− amendment). Slurry was premixed into the soil, where the volume used equated to the guideline application rate of up to 33 ton of slurry per ha in one slurry application. This means that amount of slurry used was 45 g of slurry per pot. ("Guideline application" means Teagasc—the Irish Agricultural Advisory agency provide guidelines as to the application rates for slurry to maximise fertiliser value and minimise environmental harm, e.g. https://www.teagasc.ie/media/website/crops/grassland/Grazing-Guide-Book-2011_0-21.pdf).

All pots were sown with 53 mg of Lolium Perenne var Majestic and placed in a randomised layout within a greenhouse receiving regular overhead watering. Pots were re-randomised weekly and after 3 weeks a herbage harvest was taken by cutting grass at 1 cm above the soil line. Grass was weighed and then dried for 48 hours at 80° C. before being weighed again to determine dry matter. The early-stage results are shown below.

TABLE 1

| Average yield, in grams of dry matter, per pot | |
| --- | --- |
| Amendment | Harvest |
| Unamended | 0.05 ± 0.008 |
| Untreated slurry | 0.07 ± 0.008 |
| Treated slurry | 0.08 ± 0.009 |

TABLE 2

| Average yield, in milligrams of dry matter, per pot | |
| --- | --- |
| Amendment | Harvest |
| Unamended | 47.6 ± 8.00 |
| Untreated slurry | 70.0 ± 7.61 |
| Treated slurry | 79.0 ± 8.67 |

Tables 1 and 2 show that, on average, there is a correlation between using treatments according to the invention and an increase in the production at harvest, which is indicated by an increased amount of dry matter obtained. This example indicates that in early-stage trials, treatments according to the invention produce organic waste that is a superior fertiliser compared to untreated waste.

Example 4—Assessing the Fertilising Ability of the Organic Waste Treated in Accordance with the Invention Based on a characterisation of Irish farm-based anaerobic digestion, three 10-litre continuously stirred tank bioreactors (CSTR; R1-R3) were operated at 37° C.

The untreated substrate used was cattle slurry co-digested with fats, oils and grease (FOG, from grease traps) at a ratio of 2:1. The treated slurry used was that treated as set out in Example 1.

The organic loading rate for each reactor was 2 g volatile solids (VS) L $d^{-1}$ with an 8 L working volume semi-continuously fed with a 21-day solid retention time.

Using specific methanogenic assays (SMA), inoculum was developed to combine a mixture of granular sludge, digestate from a full-scale continuously stirred tank reactor (CSTR) already processing the chosen substrate (BEOFS, Camphill, Co. Kilkenny, Ireland), with additional slurry to bolster hydrolysis, at a ratio of 2:1:1. Substrate and digestate were analysed for total and volatile solids, pH, total and soluble COD, ammonia and faecal indicator bacteria (coliforms, E. coli, enterococci). Biogas was collected and analysed for methane content and volume. Bioreactors were operated until stable prior to beginning trials.

The results were as follows:

TABLE 3

Output of anaerobic digestion substrates

| Treatment | Output (average biogas volume produced/day) |
| --- | --- |
| Untreated | 3,146.1 mL |
| Treated according to the invention | 4,492.2 mL |

These data show that waste treated in accordance with the invention produces more biogas when subjected to anaerobic digestion compared to untreated organic waste. Thus, these data confirm that organic waste treated in accordance with the invention are a superior substrate for anaerobic digestion compared to untreated waste.

Example 5—Treatments in Accordance with the Invention

Four 12 L drums containing 9 kg fresh slurry were stored at ambient outdoor temperature (~10-15° C.) in a well ventilated outdoor shed at ambient pressure. As above, the slurry used was from Holstein Friesian, grass-fed, dairy cows. The slurry in one of the four drums was left untreated, whereas the slurry in the three other drums was treated with the following compositions.
1. A composition containing 1.2 g urea-peroxide per kg of slurry and 0.133 g KI per kg of slurry.
2. A composition containing 2.4 g urea-peroxide per kg of slurry and 0.266 g KI per kg of slurry.
3. A composition containing 6 g urea-peroxide per kg of slurry and 0.665 g KI per kg of slurry.

The treatments were applied on day 0, and then re-applied on day 17.

All of the drums were sealed with modified lids to which gas bags were attached thus allowing collection of any produced biogas. Biogas is given off as the slurry biologically degrades.

The volume of biogas produced was measure via water displacement, while the methane content of the biogas was quantified by gas chromatography.

Figure 4:
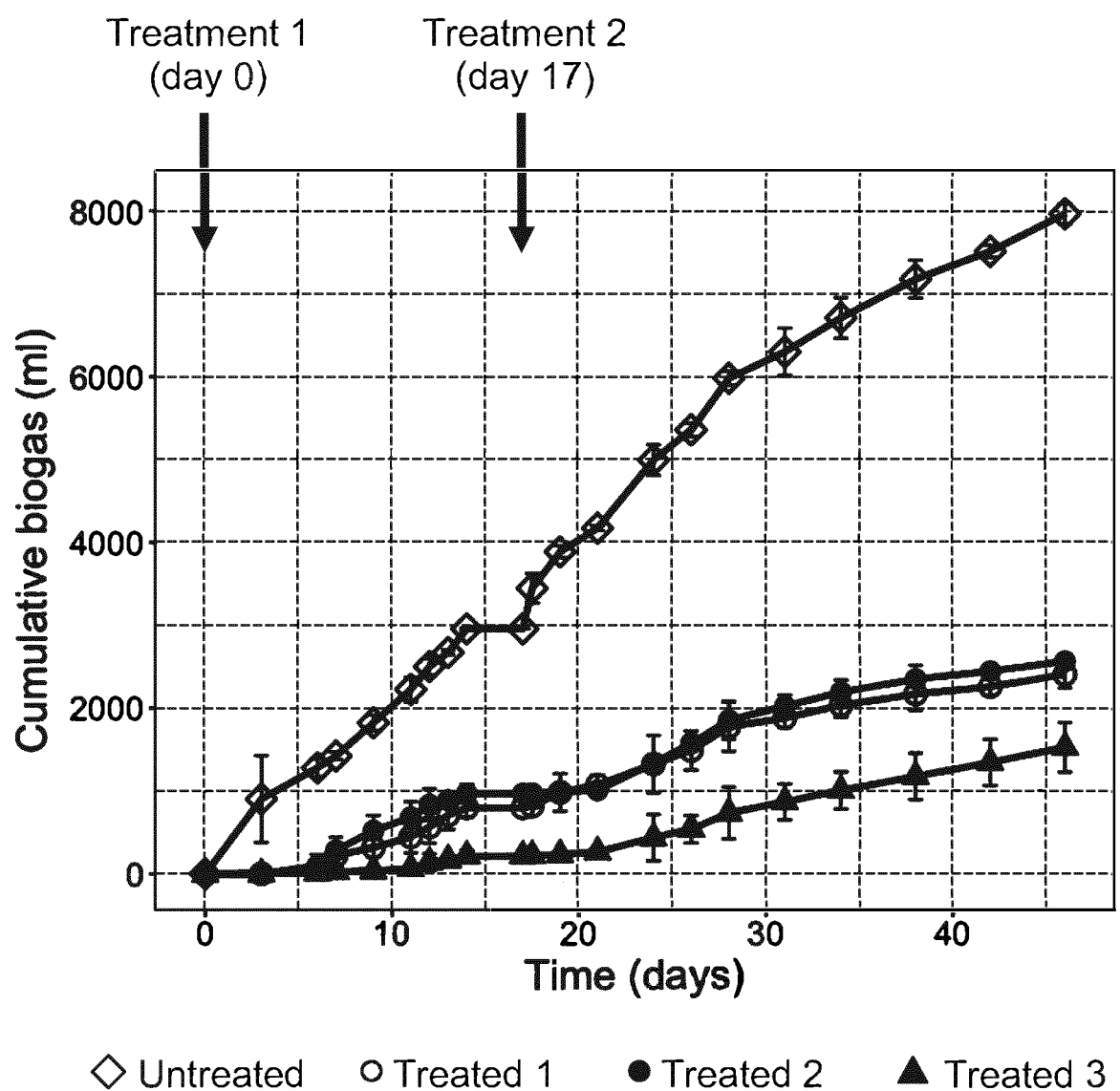
FIG. 4 shows that treatments according to the invention reduce the cumulative amount of biogas produced by the organic waste.

The results of this example are shown in FIG. 4. FIG. 4 shows that all treatments according to the invention reduce the cumulative amount of biogas produced by the organic waste. This demonstrates that the treatments of the invention reduce biological degradation of biological waste.

Example 6—Treatments with Additional Slurry

Two 25 L drums containing 12 kg fresh slurry were stored at ambient outdoor temperature (~10-15° C.) in a well ventilated outdoor shed at ambient pressure. As above, the slurry used was from Holstein Friesian, grass-fed, dairy cows. The slurry in one of the two drums was left untreated, whereas the slurry in the other drum was treated with a composition containing 2.4 g urea-peroxide per kg slurry and 0.266 g KI per kg slurry.

Approximately every 3 days, 250 g of fresh slurry were added on top of the slurry already present in the two drums. Treatment with the composition was repeated on day 13.

All of the drums were sealed with modified lids to which gas bags were attached thus allowing collection of any produced biogas. Biogas is given off as the slurry biologically degrades.

The volume of biogas produced was measure via water displacement, while the methane content of the biogas was quantified by gas chromatography.

Figure 5:
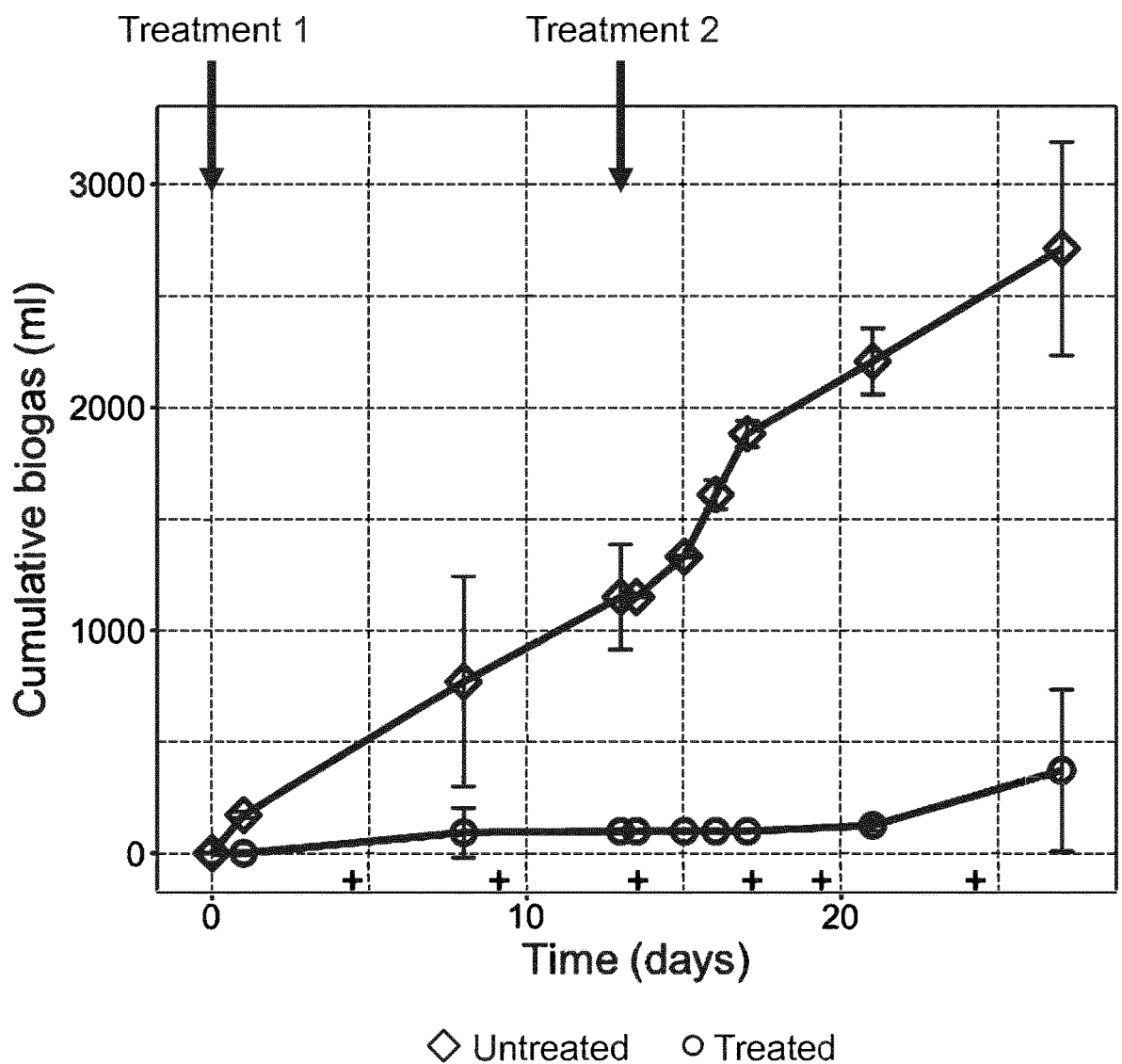
FIG. 5 shows that treatment according to the invention reduce the cumulative amount of biogas produced by the organic waste.

The results of this example are shown in FIG. 5. FIG. 5 shows that the treatment according to the invention reduce the cumulative amount of biogas produced by the organic waste. This demonstrates that the treatments of the invention reduce biological degradation of biological waste even when additional slurry is added. The "+" on FIG. 5 indicates when fresh slurry was added.

Example 7—Further Treatments According to the Invention

Five 25 L drums containing 12 kg fresh slurry were stored at ambient outdoor temperature (~10-15° C.) in a well ventilated outdoor shed at ambient pressure. As above, the slurry used was from Holstein Friesian, grass-fed, dairy cows. The slurry in one of the drums was left untreated, whereas the slurry in the other four drums was treated with the following compositions.
1. A composition containing 2.4 g urea-peroxide per kg slurry and 0.266 g KI per kg slurry.
2. A composition containing 2.4 g urea-peroxide per kg slurry.
3. A composition containing 1.53 g urea per kg slurry.
4. A composition containing 0.86 g $H_2O_2$ per kg slurry.

Treatments were applied on days 0, 13 and 49. Each treatment was tested in triplicate.

All of the drums were sealed with modified lids to which gas bags were attached thus allowing collection of any produced biogas. Biogas is given off as the slurry biologically degrades.

The volume of biogas produced was measure via water displacement, while the methane content of the biogas was quantified by gas chromatography.

Figure 6:
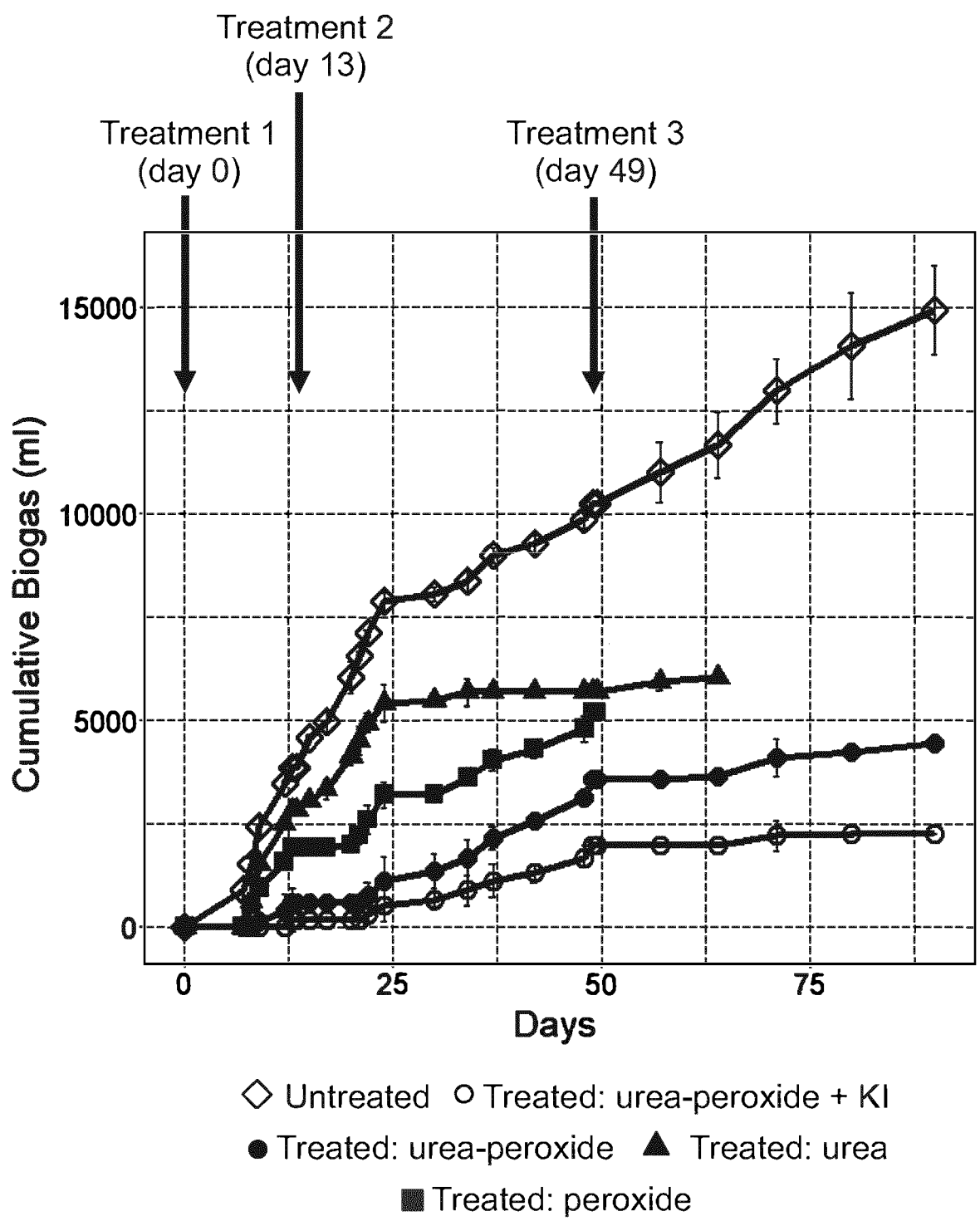
FIG. 6 shows that treatments according to the invention reduce the cumulative amount of biogas produced by the organic waste.

The results of this example are shown in FIG. 6. FIG. 6 shows that treatments according to the invention reduce the cumulative amount of biogas produced by the organic waste.

Example 8—Further Treatments According to the Invention on Cattle Slurry

Four 110 ml anaerobic vials were used to test the effect of treatments of the invention on Specific Methanogenic Activity. This method is described in Coates et al., *Journal of Microbiological Methods,* 26 (1996), 237-246.

Each vial contained 4.5 g slurry that was incubated with a phosphate buffer containing yeast extract (as described in Goering Van Soest (U.S. GOVERNMENT PRINTING OFFICE: 1970 O 387-598), and if treated, one of the below compositions. The slurry in one of the four vials was untreated, and the slurry in the other three vials was treated with the following compositions.

1. A composition containing 1.19 g urea-peroxide per kg of slurry (fresh weight) and 0.133 g KI per kg of slurry (fresh weight).
2. A composition containing 1.19 g urea-peroxide per kg slurry and 0.172 g $IKO_3$ per kg slurry.
3. A composition containing 0.172 g $IKO_3$ only per kg slurry.

The vial headspace was over-pressurised with a mix of $H_2/CO_2$ & vials placed shaking (100 rpm at 37° C.). Methanogenesis was detected by loss in headspace pressure upon consumption of $H_2/CO_2$ to produce $CH_4$.

Figure 7:
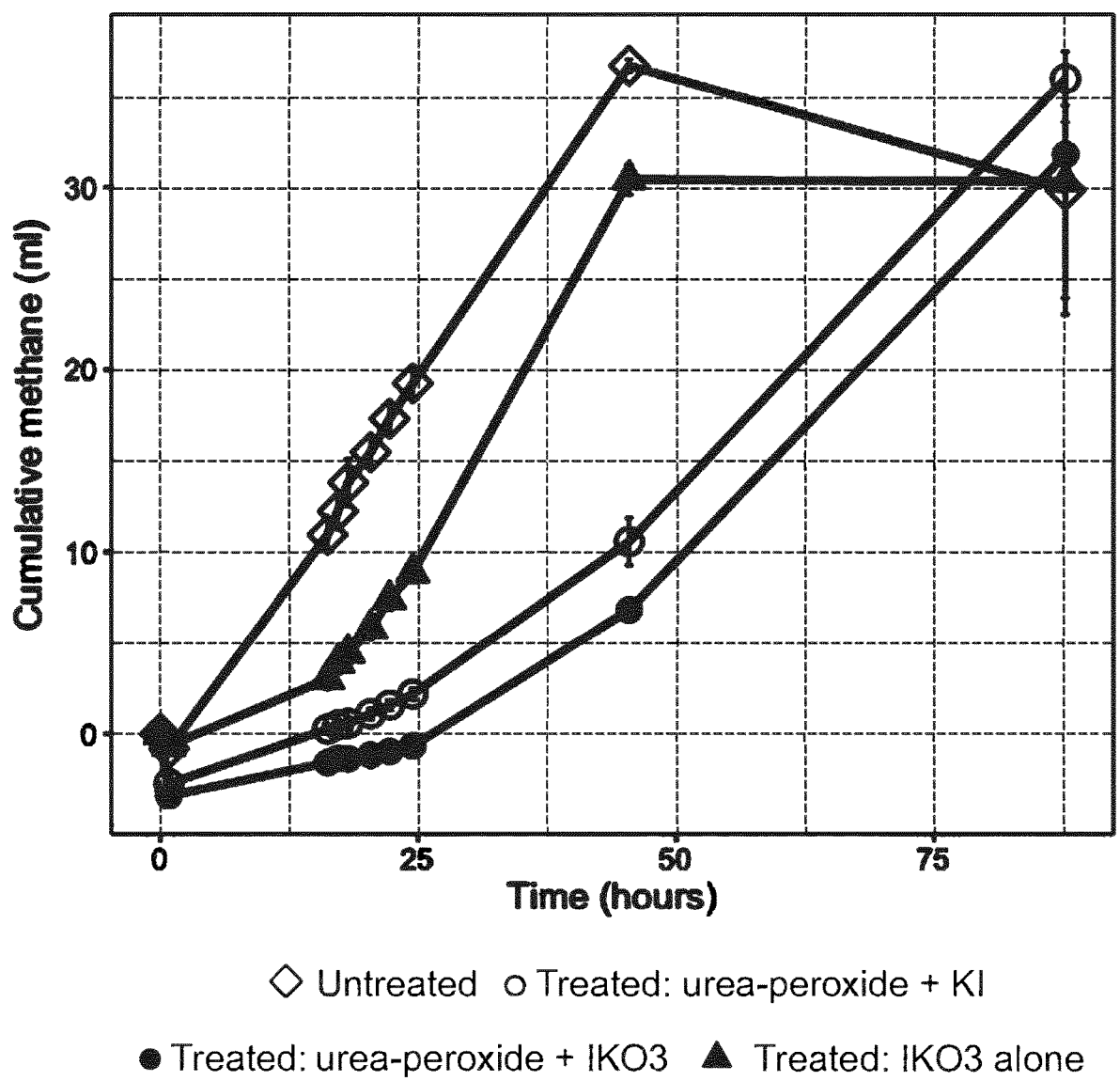
FIG. 7 shows that treatments according to the invention reduce the cumulative amount of methane produced by the organic waste.

The results of this example are shown in FIG. 7. FIG. 7 shows that treatments according to the invention reduce the cumulative amount of methane produced by the organic waste.

Example 9—Treatments According to the Invention on Pig Slurry

This example analysed the effect of treatments of the invention on swine manure.

Specific methanogenic assays (as described in Example 8 except that 9 g of pig slurry was used instead of cattle slurry) were used to assess inhibition effect of treatment on swine manure. Four vials were set up. The slurry in one vial was untreated and the slurry in the other three was treated with the following compositions.
1. A composition containing 1.19 g urea-peroxide per kg of slurry (fresh weight) and 0.133 g KI per kg of slurry (fresh weight).
2. A composition containing 0.43 g peroxide per kg of slurry (fresh weight) and 0.133 g KI per kg of slurry (fresh weight).
3. A composition containing 0.172 g $IKO_3$ per kg of slurry (fresh weight).

As for Example 8, methanogenesis was detected by loss in headspace pressure upon consumption of $H_2/CO_2$ to produce $CH_4$.

Figure 8:
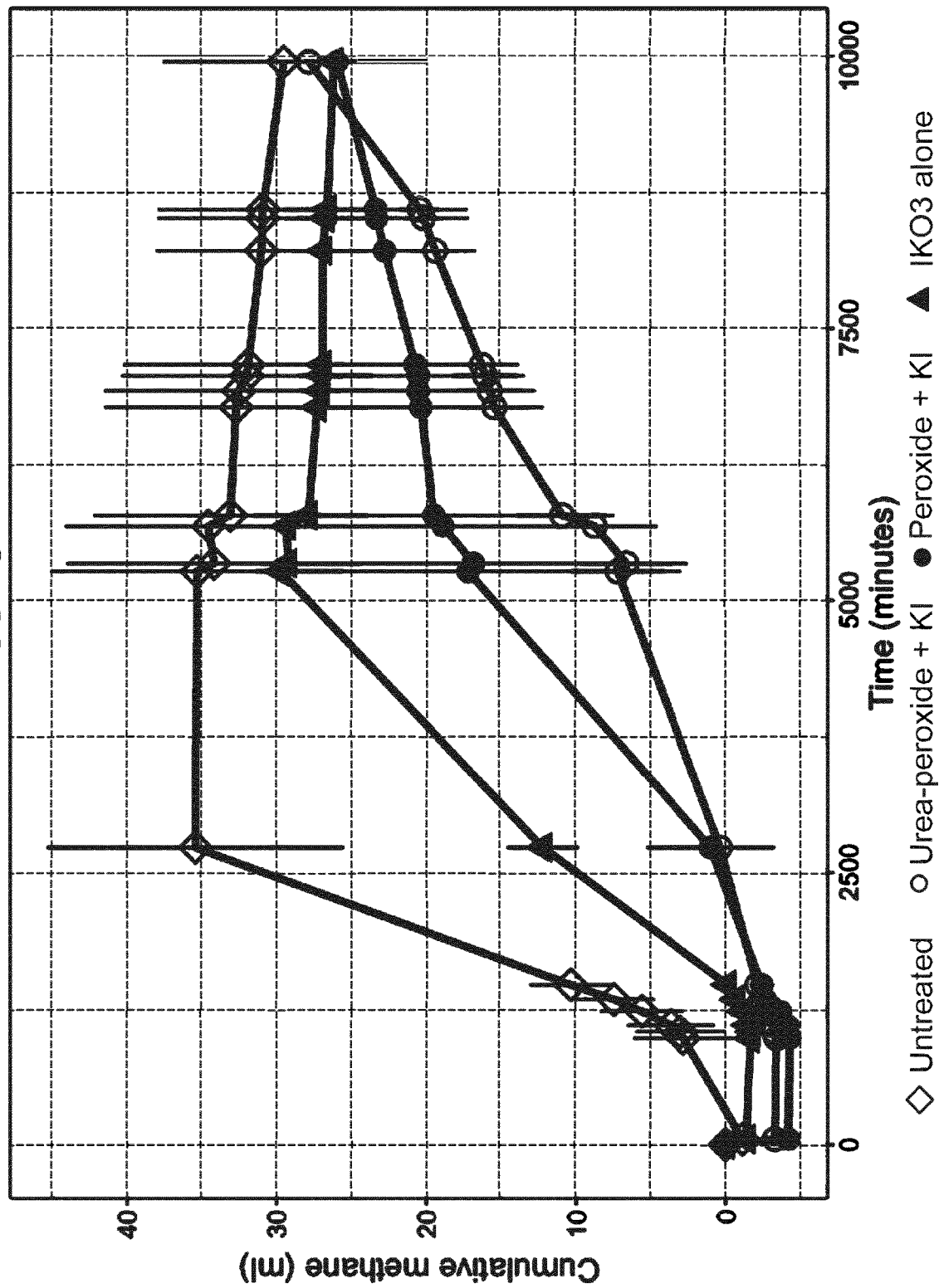
FIG. 8 shows that treatments according to the invention reduce the cumulative amount of methane produced by the organic waste.

The results of this example are shown in FIG. 8. FIG. 8 shows that treatments according to the invention reduce the cumulative amount of methane produced by the organic waste.

Example 10—Further Treatments According to the Invention on Pig Slurry

Three 12 L drums were containing 9 kg fresh slurry were stored at ambient indoor room temperature (~15-20° C.) at ambient pressure. The slurry in one of the drums was left untreated, whereas the slurry in the other two drums was treated with the following compositions.
1. A composition containing 2.66 g urea-peroxide per kg of slurry (fresh weight) and 0.265 g KI per kg of slurry (fresh weight).
2. A composition containing 0.86 g peroxide per kg of slurry (fresh weight) and 0.265 g KI per kg of slurry (fresh weight).

All of the drums were sealed with modified lids to which gas bags were attached thus allowing collection of any produced biogas. Biogas is given off as the slurry biologically degrades.

The volume of biogas produced was measure via water displacement, while the methane content of the biogas was quantified by gas chromatography.

Figure 9:
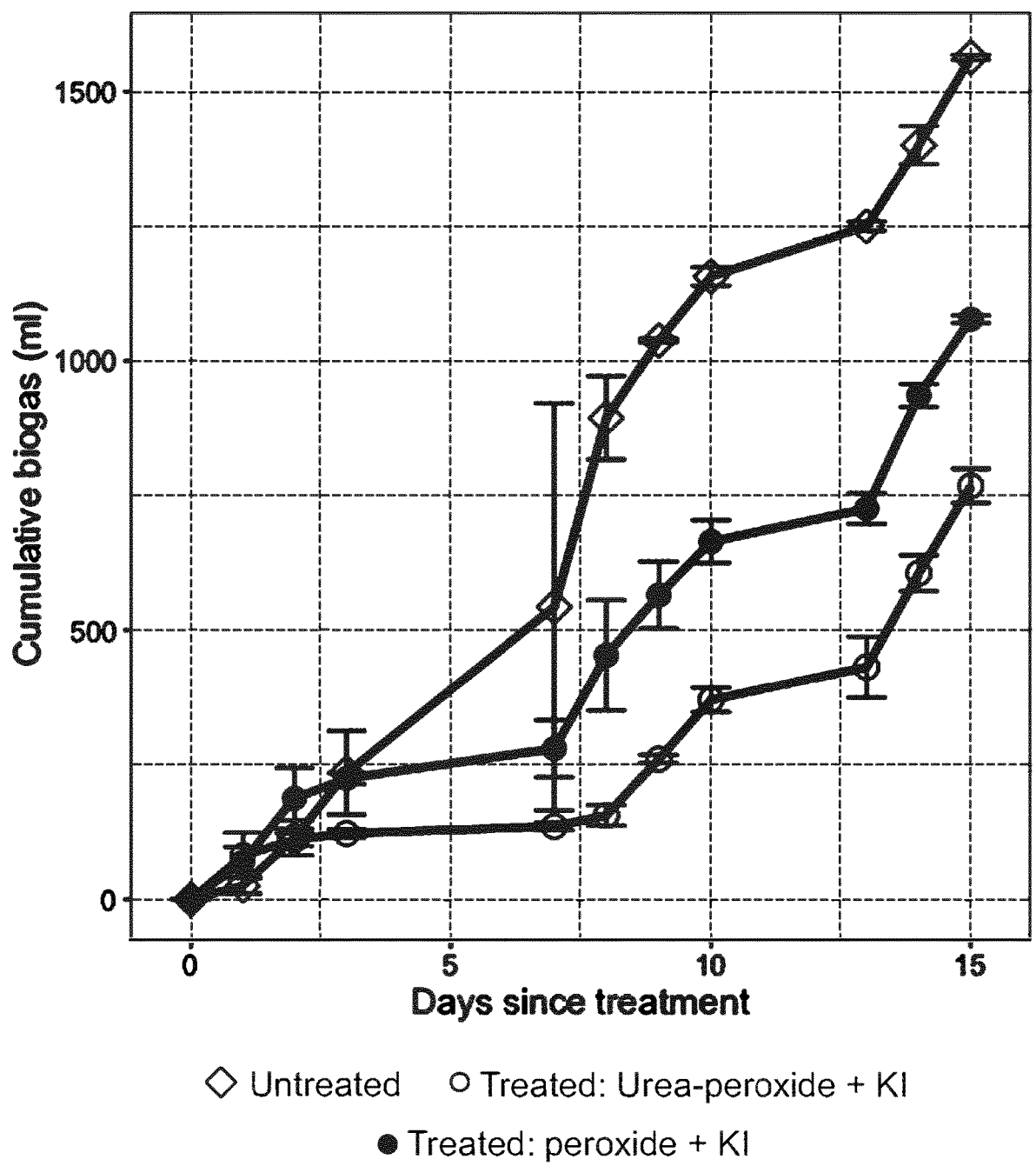
FIG. 9 shows that treatments according to the invention reduce the cumulative amount of biogas produced by the organic waste.

The results of this example are shown in FIG. 9. FIG. 9 shows that treatments according to the invention reduce the cumulative amount of biogas produced by the organic waste.

Example 11—Further Treatments According to the Invention on Pig Slurry

Three 12 L drums were containing 9 kg fresh slurry were stored at ambient indoor room temperature (~20° C.) at ambient pressure. The slurry in one of the drums was left untreated, whereas the slurry in the other two drums was treated with the following compositions.
1. A composition containing 2.66 g urea-peroxide per kg of slurry (fresh weight) and 0.265 g KI per kg of slurry (fresh weight).
2. A composition containing 0.86 g peroxide per kg of slurry (fresh weight) and 0.344 g $IKO_3$ per kg of slurry (fresh weight).

Treatments were applied on days 0 and 25.

All of the drums were sealed with modified lids to which gas bags were attached thus allowing collection of any produced biogas. Biogas is given off as the slurry biologically degrades.

The volume of biogas produced was measure via water displacement, while the methane content of the biogas was quantified by gas chromatography.

Figure 10:
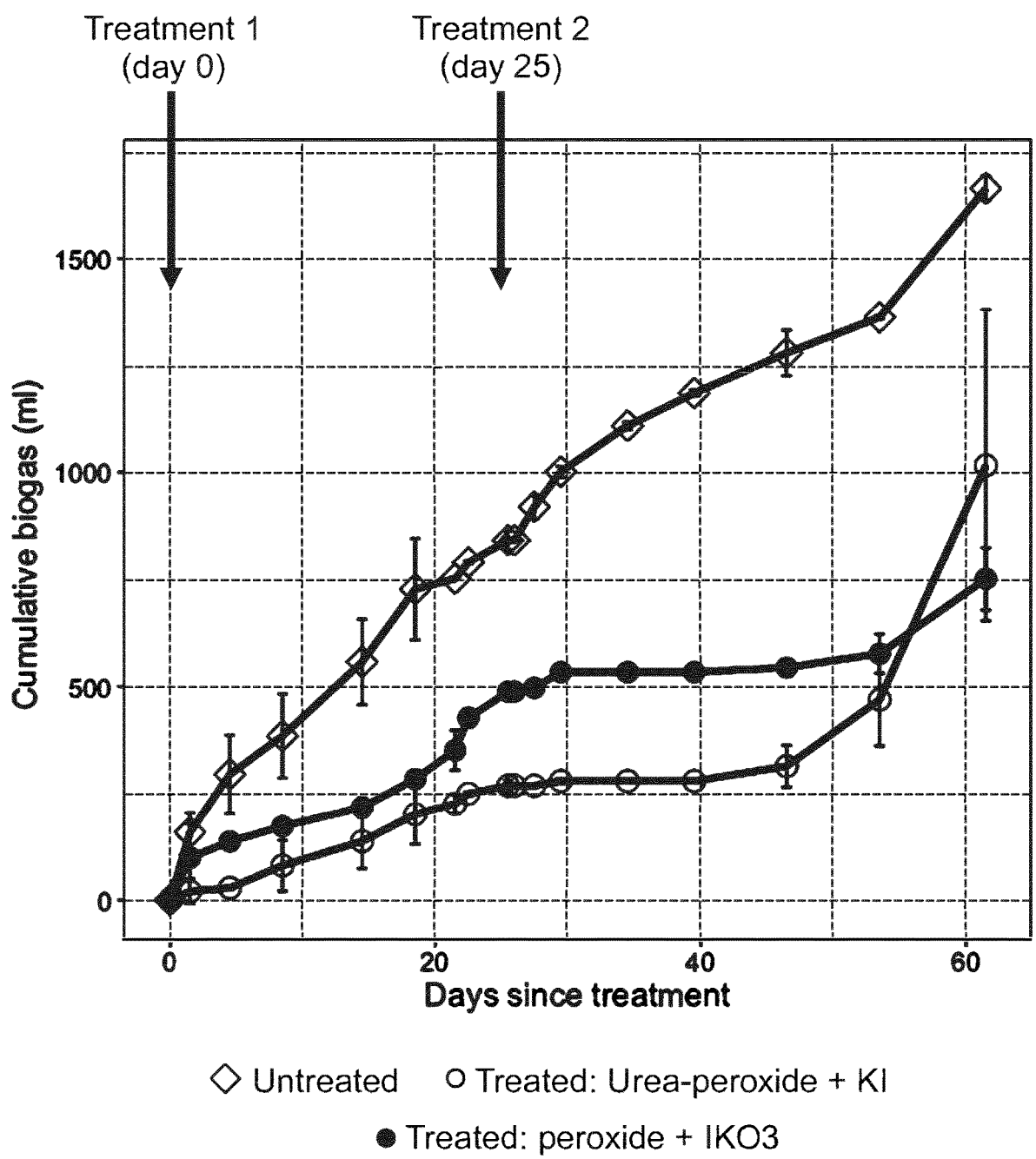
FIG. 10 shows that treatments according to the invention reduce the cumulative amount of biogas produced by the organic waste.

The results of this example are shown in FIG. 10. FIG. 10 shows that treatments according to the invention reduce the cumulative amount of biogas produced by the organic waste.

Example 12—Treatments According to the Invention on Digestate Sampled from a Mesophilic Anaerobic Digester The digestate used in this example was sampled from a mesophilic anaerobic digester co-digesting food waste and cattle slurry.

Five 250 mL vials containing 100 g of digestate were subjected to shaking (100 rpm) at 37° C. the slurry in one of the vials was untreated. The slurry in the other four vials was treated with the following compositions.
1. A compositions containing 2.4 g urea-peroxide per kg of digestate (fresh weight) and 0.265 g KI per kg of digestate (fresh weight)
2. A compositions containing 1.53 g urea per kg slurry.
3. A composition containing 2.4 g urea-peroxide per kg of digestate (fresh weight).
4. A composition containing 2.4 g urea-peroxide+0.344 g $IKO_3$ per kg of slurry (fresh weight).

Vials were at ambient pressure and biogas collected over 9 days.

All of the vials were sealed with modified lids to which gas bags were attached thus allowing collection of any produced biogas. Biogas is given off as the slurry biologically degrades.

The volume of biogas produced was measure via water displacement, while the methane content of the biogas was quantified by gas chromatography.

Figure 11:
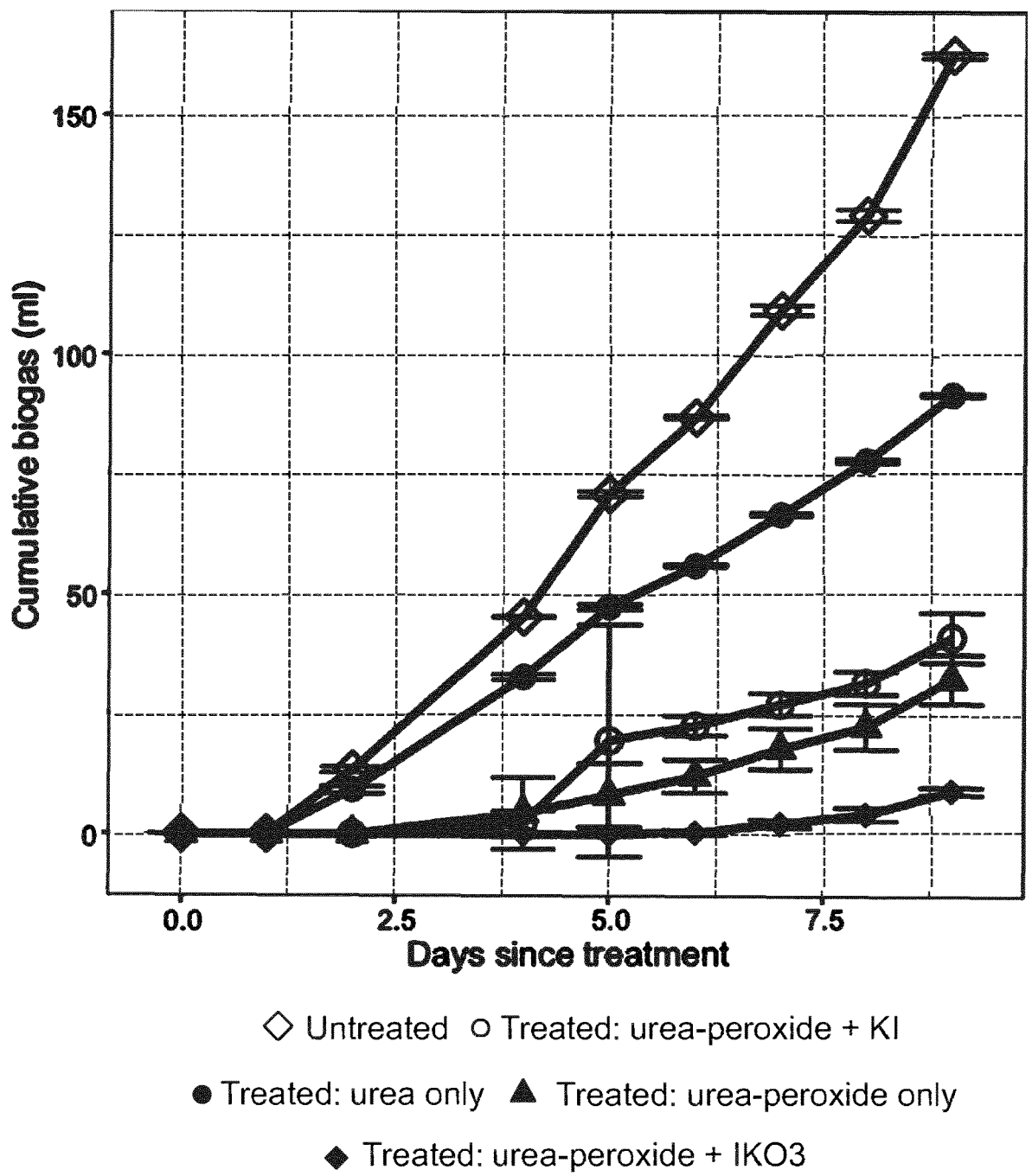
FIG. 11 shows that treatments according to the invention reduce the cumulative amount of biogas produced by the organic waste.

The results of this example are shown in FIG. 11. FIG. 11 shows that treatments according to the invention reduce the cumulative amount of biogas produced by the organic waste.

Example 13—Treatments According to the Invention in an Anaerobic Digester

A comparison of the efficiency of the fermentation process is reflected in an experiment, which monitored VFA production from a mixture of food waste and animal manure during a 150-day continuous anaerobic bioreactor trial.

Two 10 L anaerobic CSTR bioreactors were used to ferment cattle slurry (40% of the volatile solids in the feedstock) and a mixture of fats, oils and grease (60% of the volatile solids in the feedstock) at a loading rate of 0.5 g volatile solids/L of reactor/day. The feedstock in one of the bioreactors was left untreated. The feedstock for the other bioreactor was treated with a composition containing 2.4 g urea-peroxide per kg and 0.266 g KI per kg immediately prior to being introduced to the digester.

The average VFA yield in a control bioreactor (untreated) over 17 separate weekly timepoints was 26.72+/−0.85 g VFA as Chemical Oxygen Demand/L/Day, as measured using gas chromatography (APHA, 2005 Standard Methods for the Examination of Water and Wastewater).

The average VFA yield in a bioreactor treated over 17 separate weekly timepoints was 32.21+/−1.37 g VFA as Chemical Oxygen Demand/L/Day The "g volatile solids" was also determined as set out in APHA, 2005 Standard Methods for the Examination of Water and Wastewater.

These results demonstrate that treatment according to the invention led to a 20.1% increase in VFA and MCCA yield compared to the untreated bioreactor. These results indicate that treatments according to the invention could be a major advance on the state of the art of VFA/MCCA production.

NUMBERED EMBODIMENTS

1. A method for treating organic waste comprising:
contacting organic waste with a composition that is capable of generating a reactive species;
wherein the composition comprises an oxidising agent, and
wherein the reactive species is generated from a source of iodide (I$^-$) and the oxidising agent.

2. Use of a composition that is capable of generating a reactive species, in a method of reducing the biological degradation of organic waste, in the treatment of organic waste.

3. The use according to numbered embodiment 2, wherein the method of reducing the biological degradation of organic waste is a method of reducing methanogenesis.

4. The use according to numbered embodiment 2, wherein the method of reducing the biological degradation of organic waste is a method of reducing the loss of fertilising compounds from organic waste in the treatment of organic waste.

5. The use according to numbered embodiment 4, wherein the composition reduces the loss of carbon containing fertilising compounds, phosphorous containing fertilising compounds, and/or nitrogen containing fertilising compounds.

6. The use according to numbered embodiment 5, wherein the nitrogen containing fertilising compounds are ammonium salts.

7. The use according to numbered embodiment 5, wherein the composition reduces the loss of amino acids, nitrate ($NO_3^-$) salts or nitrite ($NO_2^-$) salts.

8. The use according to any of numbered embodiments 2 to 7, wherein the reactive species is generated from a source of iodide (I$^-$) and an oxidising agent.

9. The use according to numbered embodiment 8, wherein the composition comprises the oxidising agent.

10. The method according to numbered embodiment 1, or the use according to any of numbered embodiments 2 to 9, wherein the composition is substantially free of any acid having a pKa in water of less than pKa 8.

11. The method according to numbered embodiment 10, or the use according to numbered embodiment 10, wherein the composition comprises less than 10 weight %, less than 5 weight %, less than 2 weight %, less than 1 weight %, less than 0.5 weight %, or less than 0.1 weight %, of any acid having a pKa in water of less than pKa 8.

12. The method according to numbered embodiment 11, or the use according to numbered embodiment 11, wherein the composition does not comprise an acid having a pKa in water of less than 8.

13. The method according to any of numbered embodiments 1 or 10 to 12, or the use according to any of numbered embodiments 2 to 12 wherein the pH of 1 g of the composition in a litre of water is greater than pH 4.

14. The method according to any of numbered embodiments 1 or 10 to 13, or the use according to any of numbered embodiments 2 to 13, wherein the composition does not acidify the organic waste during the treatment.

15. The method according to numbered embodiment 14, or the use according to numbered embodiment 14, wherein the pH level of the organic waste is reduced by less than two pH units during treatment of the organic waste.

16. The method according to numbered embodiment 15, or the use according to numbered embodiment 15, wherein the pH level of the organic waste is reduced by less than one pH unit during treatment of the organic waste.

17. The method according to numbered embodiment 16, or the use according to numbered embodiment 16, wherein the pH level of the organic waste is reduced by less than 0.5 pH units during treatment of the organic waste.

18. The method according to any of numbered embodiments 1 or 10 to 17, or the use according to any of any of numbered embodiments 8 to 17, wherein the organic waste comprises the source of iodide (I$^-$).

19. The method according to any of numbered embodiments 1 or 10 to 18, or the use according to any of numbered embodiments 8 to 18, wherein composition comprises the source of iodide (I$^-$).

20. The method according to any of numbered embodiments 1 or 10 to 19, or the use according to any of numbered embodiments 8 to 19, wherein the source of iodide (I$^-$) is selected from the group consisting of: sodium iodide (NaI), potassium iodide (KI), lithium iodide (LiI), caesium iodide (CsI), hydrogen iodide (HI), rhodium iodide ($RhI_3$), and combinations thereof.

21. The method according to numbered embodiment 20, or the use according to numbered embodiment 20, wherein source of iodide (I$^-$) is potassium iodide (KI).

22. The method according to any of numbered embodiments 1 or 10 to 21, or the use according to any of numbered embodiments 8 to 21, wherein the oxidising agent is a source of peroxide ($O_2^{2-}$), or an oxidising agent selected from the group consisting of: a source of iodate ($[IO_3]^-$) (e.g. sodium iodate, potassium iodate), a source of permanganate ($[MnO_4]^-$) (e.g. sodium permanganate, potassium permanganate), and combinations thereof.

23. The method according to numbered embodiment 22, or the use according to numbered embodiment 22, wherein the oxidising agent is a source of permanganate ($[MnO_4]^-$), preferably potassium permanganate.

24. The method according to numbered embodiment 22, or the use according to numbered embodiment 22, wherein the oxidising agent is a source of iodate ($[IO_3]^-$) (e.g. sodium iodate, potassium iodate).

25. The method according to numbered embodiment 22, or the use according to numbered embodiment 22, wherein the oxidising agent is a source of peroxide ($O_2^{2-}$).

26. The method according to numbered embodiment 25, or the use according to numbered embodiment 25, wherein the source of peroxide ($O_2^{2-}$) is selected from the group consisting of: hydrogen peroxide, sodium peroxide, lithium peroxide, peroxide releasing citric acid, peroxide releasing Vitamin C, peroxide salts (e.g. barium oxide), sodium perborate, oxygen releasing pseudo peroxides (e.g. superoxides, dioygenals, ozones, and ozonides), organic peroxides (e.g. peroxy acids, acyl halides, and aliphatic peroxides), a peroxide-releasing percarbonate (e.g. sodium percarbonate, potassium percarbonate or a slow-releasing form of a peroxide-releasing percarbonate), peroxide-urea adduct, enzymatic reaction between a sugar and its appropriate oxidoreductase, and combinations thereof.

27. The method according to any of numbered embodiments 25 or 26, or the use according to any one of numbered embodiments 25 or 26, wherein the source of peroxide ($O_2^{2-}$) is hydrogen peroxide ($H_2O_2$).

28. The method according to numbered embodiments 27, or the use according to numbered embodiment 26, wherein the composition comprises hydrogen peroxide, and the ratio of iodide ions to hydrogen peroxide is between $1(I^-):0.1$ (hydrogen peroxide) and $1(I^-):15$ (hydrogen peroxide) during the treatment of the organic waste.

29. The method according to numbered embodiment 28, or the use according to numbered embodiment 27, wherein the ratio of iodide ions to hydrogen peroxide is between $1(I^-):0.1$ (hydrogen peroxide) and $1(I^-):5$ (hydrogen peroxide) during the treatment of the organic waste, preferably between $1(I^-):0.1$ (hydrogen peroxide) and $1(I^-):3.5$ (hydrogen peroxide).

30. The method according to numbered embodiment 29, or the use according to numbered embodiment 28, wherein the ratio of iodide ions to hydrogen peroxide is selected from the group consisting of:
  $1(I^-):0.1$ (hydrogen peroxide);
  $1(I^-):0.4$ (hydrogen peroxide);
  $1(I^-):1.1$ (hydrogen peroxide);
  $1(I^-):2.5$ (hydrogen peroxide); and
  $1(I^-):3.2$ (hydrogen peroxide).

31. The method according to numbered embodiment 30, or the use according to numbered embodiment 30, wherein the ratio of iodide ions to hydrogen peroxide in the composition is $1(I^-):3.2$ (hydrogen peroxide).

32. The method according to any of numbered embodiments 1 or 10 to 31, or the use according to any of numbered embodiments 2 to 31, wherein the composition comprises a source of urea.

33. The method according to numbered embodiment 32, or the use according to numbered embodiment 32, wherein the source of urea is selected from the group consisting of: urea, a peroxide-urea adduct, proteins, amino acids, urine, and combinations thereof.

34. The method according to any of numbered embodiments 32 or 33, or the use according to any of numbered embodiments 32 or 33, wherein the source of urea is urea.

35. The method according to any of numbered embodiments 22 or 24 to 33, or the use according to any of numbered embodiments 22 or 24 to 33, wherein the composition comprises a hydrogen peroxide-urea adduct.

36. The method according to any of numbered embodiments 1 or 10 to 35, or the use according to any of numbered embodiments 2 to 35, wherein the composition comprises potassium iodide and hydrogen peroxide.

37. The method according to any of numbered embodiments 1 or 10 to 36, or the use according to any of numbered embodiments 2 to 36, wherein the composition comprises a source of thiocyanate ($[SCN]^-$).

38. The method according to numbered embodiment 37, or the use according to numbered embodiment 37, wherein the source of thiocyanate ($[SCN]^-$) is selected from the group consisting of: sodium thiocyanate, potassium thiocyanate, lithium thiocyanate, caesium thiocyanate, hydrogen thiocyanate, rhodium thiocyanate, and allyl isothiocyanate.

39. The method according to any of numbered embodiments 1 or 10 to 38, or the use according to any of numbered embodiments 2 to 37, wherein the composition comprises a cyanate compound such as potassium cyanate or thiocyanogens.

40. The method according to any of numbered embodiments 1 or 10 to 39, or the use according to any of numbered embodiments 2 to 38, wherein the amount of composition used in the treatment is between about 0.01 kg and about 0.1 kg per tonne of organic waste; or between about 0.1 kg and 1 kg per tonne of organic waste, or between about 1 kg and about 5 kg per tonne of organic waste, or between about 5 kg and about 10 kg per tonne of organic waste, or between about 10 kg and about 20 kg per tonne of organic waste, or between about 20 kg and about 50 kg per tonne of organic waste, or between about 50 kg and about 100 kg per tonne of organic waste.

41. The method according to numbered embodiment 40, or the use according to numbered embodiment 40, wherein the amount of composition used in the treatment is selected from the group consisting of:
  about 0.33 mg per gram of organic waste;
  about 0.67 mg per gram of organic waste;
  about 1.33 mg per gram of organic waste.

42 The method according to numbered embodiment 40, or the use according to numbered embodiment 40, wherein the amount of composition used in the treatment is selected from the group consisting of:
  about 2.66 mg per gram of organic waste; and
  about 3.39 mg per gram of organic waste.

43 The method according to numbered embodiment 41, or the use according to numbered embodiment 41, wherein the amount of composition used is about 1.33 mg per gram of organic waste.

44. The method according to numbered embodiment 42, or the use according to numbered embodiment 42, wherein the amount of composition used is about 3.39 mg per gram of organic waste.

45. The method according to any of numbered embodiments 1 or 10 to 44, or the use according to any of numbered embodiments 2 to 44, wherein the organic waste is human waste, compostable waste, fungi waste, or animal waste.

46. The method according to numbered embodiment 45, or the use according to numbered embodiment 45, wherein the animal waste is from a cow, pig, horse, sheep, hen, chicken, turkey, duck, deer, or goat.

47. The method according to numbered embodiment 46, or the use according to numbered embodiment 46, wherein the animal waste is waste from a cow, for example, manure, urine, or slurry.

48. The method according to any of numbered embodiments 1 or 10 to 47, or the use according to any of numbered embodiments 2 to 47, wherein the reactive species is an iodophor or a source of hypoiodite ($IO^-$).

49. The method according to any of numbered embodiments 1 or 10 to 48, wherein the method reduces the production of methane from the organic waste by methanogenesis.

50. The method according to any of numbered embodiments 1 or 10 to 49, wherein the method reduces the loss of nitrogen-containing fertilising compounds from the organic waste.

51. The organic waste treated by the method of any of numbered embodiments 1 or 10 to 50.

52. The organic waste according to numbered embodiment 51, wherein the concentration of fertilising compounds in the organic waste is greater than the concentration of fertilising compounds in organic waste that has been stored for the same duration that has not been treated by the method of any of numbered embodiments 1 or 10 to 51.

53. The organic waste according to any or numbered embodiments 51 to 52, wherein the concentration of fertilising compounds in the organic waste is more than about 100% greater than the amount of fertilising compounds in organic waste that has been stored for the same duration that has not been treated by the method of any of numbered embodiments 1 or 10 to 51, preferably more than about 130%, more preferably between about 200% to 400%, 400% to 600%, 400% to 800%, or 600% to 800%.

54. Use of the organic waste according to any of numbered embodiments 51 to 53 as a fertiliser; as a biomass fuel; as a soil conditioner; as a feedstock for anaerobic digestion; as a feedstock for biorefining; as a feedstock for production of animal feed (e.g. fish food); as a feedstock for production of algae; as a feedstock for production of animal protein (e.g. insects/worms etc); as a feedstock/substrate for chemical synthesis; as a feedstock for production of construction materials; as a feedstock for production of animal bedding; as a feedstock for the production of paper; or as a feedstock for thermal conversion processes such as pyrolysis or gasification.

55. Use of the organic waste according to any of numbered embodiments 51 to 53 as a feedstock for the manufacture of fertilisers, such as struvites, biochars, or phosphate salts.

56. A method for improving the production of volatile fatty acids (VFAs) and medium-chain carboxylic acids (MCCAs) during anaerobic digestion (AD) of organic waste, the method comprising contacting a composition that is capable of generating a reactive species with the organic waste.

57. The method according to numbered embodiment 56, wherein the composition generates a reactive species that inhibits methanogenesis of the organic waste.

58. The method according to any of numbered embodiments 56 or 57, wherein the composition is as defined in any of numbered embodiments 8 to 14, or 18 to 44.

59. The method according to any of numbered embodiments 56 to 58, wherein the method comprises fermenting the organic waste.

60. The method according to numbered embodiment 59, wherein the composition that is capable of generating a reactive species is contacted with the organic waste before the organic waste is fermented.

61. The method according to any of numbered embodiments 59 to 60, further comprising collecting the VFAs and MCCAs after fermenting the organic waste.

62. The method according to any of numbered embodiments 56 to 61, wherein the yield of VFAs and MCCAs collected from the method is increased by at least 5%.

63. The method according to any of numbered embodiments 56 to 62, wherein the yield of VFAs and MCCAs collected from the method is increased by between 10% and 25%.

64. The method according to any of numbered embodiments 56 to 63, wherein the composition comprises a source of peroxide ($O_2^{2-}$) and a source of iodide ($I^-$).

65. The method according to numbered embodiment 64, wherein the composition comprises urea-peroxide.

66. The method according to any of numbered embodiments 64 or 65, wherein the composition comprises potassium iodide.

67. The method according to any of numbered embodiments 64 to 66, wherein the composition comprises potassium iodide.

The invention claimed is:

1. A method of reducing the loss of nitrogen containing fertilizing compounds from organic waste, the method comprising treating the organic waste with a composition and generating a reactive species from a source of iodide ($I^-$) and a source of peroxide ($O_2^{2-}$); wherein the composition comprises the source of peroxide ($O_2^{2-}$), the organic waste and/or the composition comprises the source of iodide (I-), the nitrogen containing fertilizing compounds are ammonium compounds, the organic waste treated according to the method retains more ammonium compounds compared to untreated waste stored for the same duration of time, and wherein the composition is distributed into the organic waste substantially evenly.

2. The method according to claim 1, wherein the method of reducing the loss of fertilising compounds from organic waste reduces methanogenesis relative to untreated waste stored for the same duration of time.

3. The method according to claim 1, wherein the composition is substantially free of any acid having a pKa in water of less than pKa 8.

4. The method according to claim 1, wherein the composition does not acidify the organic waste during the treatment.

5. The method according to claim 1, wherein source of iodide ($I^-$) is potassium iodide (KI).

6. The method according to claim 1, wherein the source of peroxide ($O_2^{2-}$) is hydrogen peroxide ($H_2O_2$).

7. The method according to claim 1, wherein the composition comprises a source of urea.

8. The method according to claim 7, wherein the source of urea is selected from the group consisting of: urea, a peroxide-urea adduct, proteins, amino acids, urine, and combinations thereof.

9. The method according to claim 1, wherein the composition comprises a hydrogen peroxide-urea adduct.

10. The method according to claim 1, wherein the composition comprises potassium iodide and hydrogen peroxide.

11. The method according to claim 1, wherein the organic waste is human waste, compostable waste, fungi waste, or animal waste.

12. The method according to claim 1, wherein the organic waste is biodegradable organic matter.

13. The method according to claim 1, wherein the composition is in the form of one or more capsules or tablets.

14. Organic waste treated according to the method of claim 1.

15. A method, comprising:
providing an organic waste treated with a composition comprising a source of peroxide ($O_2^{2-}$), wherein a reactive species is generated from a source of iodide ($I^-$) and the source of peroxide ($O_2^{2-}$), wherein the organic waste and/or the composition comprises the source of iodide (I-); and
fertilizing soil with the organic waste;
combusting the organic waste as a biomass fuel;
conditioning soil with the organic waste;
anaerobically digesting the organic waste;
biorefining the organic waste;
producing animal feed with the organic waste;
producing algae with the organic waste;
producing animal protein with the organic waste;
conducting chemical synthesis with the organic waste;
producing construction materials with the organic waste;

producing animal bedding with the organic waste;
producing paper with the organic waste; or
thermally converting the organic waste.

\* \* \* \* \*